(12) United States Patent
Yamada

(10) Patent No.: US 9,177,581 B2
(45) Date of Patent: Nov. 3, 2015

(54) HEAD POSITION DEMODULATION METHOD AND MAGNETIC DISK DEVICE

(71) Applicant: KABUSHIKI KAISHA TOSHIBA, Tokyo (JP)

(72) Inventor: Tomoyoshi Yamada, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 14/194,482

(22) Filed: Feb. 28, 2014

(65) Prior Publication Data

US 2015/0146318 A1 May 28, 2015

Related U.S. Application Data

(60) Provisional application No. 61/908,291, filed on Nov. 25, 2013.

(51) Int. Cl.
| | |
|---|---|
| G11B 20/06 | (2006.01) |
| G11B 21/02 | (2006.01) |
| G11B 5/58 | (2006.01) |
| G11B 5/596 | (2006.01) |
| G11B 5/48 | (2006.01) |

(52) U.S. Cl.
CPC .......... *G11B 5/59688* (2013.01); *G11B 5/4886* (2013.01)

(58) Field of Classification Search
None
See application file for complete search history.

(56) References Cited

U.S. PATENT DOCUMENTS

| | | | |
|---|---|---|---|
| 4,549,232 A | 10/1985 | Axmear et al. | |
| 5,689,384 A | 11/1997 | Albrecht et al. | |
| 6,046,879 A | 4/2000 | Hampshire | |
| 6,067,204 A | 5/2000 | Tremaine | |
| 6,535,348 B1 * | 3/2003 | Kagami et al. | 360/78.08 |
| 6,590,729 B1 | 7/2003 | Akagi et al. | |
| 7,209,314 B2 | 4/2007 | Bandic et al. | |
| 7,312,946 B2 | 12/2007 | Asakura et al. | |
| 7,440,224 B2 | 10/2008 | Ehrlich et al. | |
| 7,457,066 B2 | 11/2008 | Ehrlich et al. | |
| 7,529,059 B2 | 5/2009 | Ryu et al. | |
| 7,859,787 B2 | 12/2010 | Kisaka | |
| 8,023,219 B2 | 9/2011 | Kosugi | |
| 8,295,002 B1 | 10/2012 | Katchmart | |
| 8,625,230 B2 | 1/2014 | Kosugi et al. | |
| 8,867,162 B2 * | 10/2014 | Sudo | 360/77.08 |
| 2009/0040641 A1 | 2/2009 | Ehrlich et al. | |
| 2012/0293885 A1 | 11/2012 | Kosugi et al. | |

FOREIGN PATENT DOCUMENTS

| | | |
|---|---|---|
| JP | 07-065306 | 3/1995 |
| JP | 2000-514585 | 10/2000 |

(Continued)

OTHER PUBLICATIONS

U.S. Appl. No. 14/018,212, filed Sep. 4, 2013, Kabushiki Kaisha Toshiba.

*Primary Examiner* — K. Wong

(74) *Attorney, Agent, or Firm* — Knobbe, Martens, Olson & Bear, LLP

(57) ABSTRACT

According to one embodiment, at demodulation of an A-phase burst pattern and a B-phase burst pattern arranged in a down-track direction so as to be different from each other in phase in a cross-track direction, the demodulated position of a magnetic head is calculated based on a sin component and a cos component in the A-phase burst pattern and a sin component and a cos component in the B-phase burst pattern.

18 Claims, 29 Drawing Sheets

(56) References Cited

FOREIGN PATENT DOCUMENTS

| | | |
|---|---|---|
| JP | 2001-110027 | 4/2001 |
| JP | 2006-309843 | 11/2006 |
| JP | 2009-110597 | 5/2009 |
| JP | 4649421 | 12/2010 |
| JP | 2012-243367 | 12/2012 |
| WO | WO 2008/139603 | 11/2008 |

\* cited by examiner

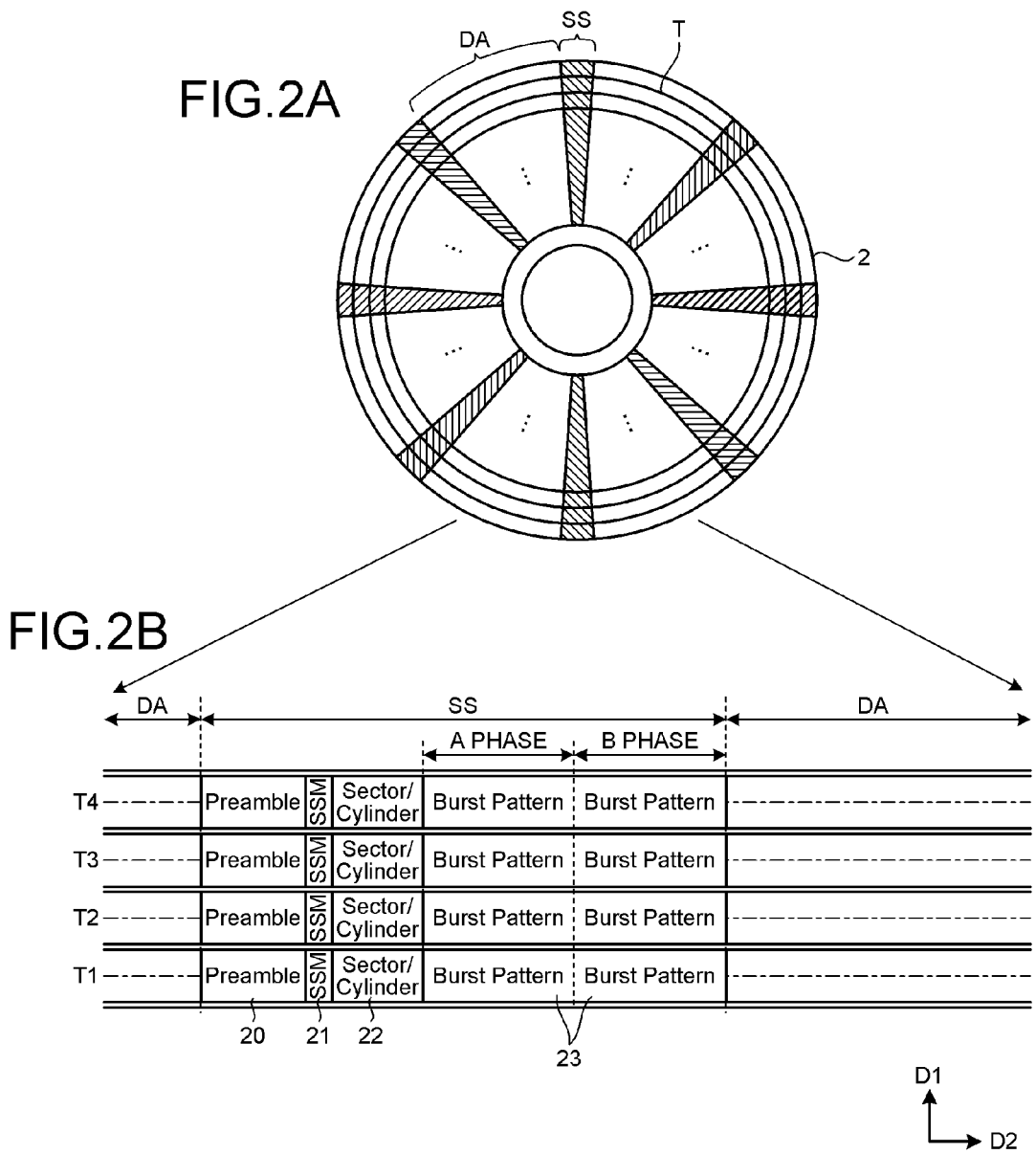

```
         k|   A    |   B    |                    k|   A    |   B    |
         0|NNSSNNSS|SSNNSSNN|                    0|NNSSNNSS|SSNNSSNN|
FIG.3A   1|NNSSNNSS|NNSSNNSS|   FIG.3B           1|SNNSSNNS|SNNSSNNS|
         2|SSNNSSNN|NNSSNNSS|                    2|SSNNSSNN|NNSSNNSS|
         3|SSNNSSNN|SSNNSSNN|                    3|NSSNNSSN|NSSNNSSN| k|   A    |   B    |                    k|   A    |   B    |
         0|NNSSNNSS|SNNSSNNS|                    0|NNSSNNSS|SSNNSSNN|
FIG.3C   1|SNNSSNNS|SSNNSSNN|   FIG.3D           1|SNNSSNNS|NSSNNSSN|
         2|SSNNSSNN|NSSNNSSN|                    2|SSNNSSNN|NNSSNNSS|
         3|NSSNNSSN|NNSSNNSS|                    3|NSSNNSSN|SNNSSNNS| k|   A    |   B    |                    k|   A    |   B    |
         0|NNSSNNSS|SNNSSNNS|                    0|NNSSNNSS|SSNNSSNN|
FIG.3E   1|SNNSSNNS|NNSSNNSS|   FIG.3F           1|SNNSSNNS|SNNSSNNS|
         2|SSNNSSNN|NSSNNSSN|                    2|SSNNSSNN|NNSSNNSS|
         3|NSSNNSSN|SSNNSSNN|                    3|NSSNNSSN|NSSNNSSN| k|   A    |   B    |                    k|   A    |   B    |
         0|NNSSNNSS|NNSSNNSS|                    0|NNSSNNSS|SSNNSSNN|
         1|NNSSNNSS|SNNSSNNS|                    1|NNSSNNSS|SNNSSNNS|
         2|SNNSSNNS|SNNSSNNS|                    2|SNNSSNNS|SNNSSNNS|
FIG.3G   3|SNNSSNNS|SSNNSSNN|   FIG.3H           3|SNNSSNNS|NNSSNNSS|
         4|SSNNSSNN|SSNNSSNN|                    4|SSNNSSNN|NNSSNNSS|
         5|SSNNSSNN|NSSNNSSN|                    5|SSNNSSNN|NSSNNSSN|
         6|NSSNNSSN|NSSNNSSN|                    6|NSSNNSSN|NSSNNSSN|
         7|NSSNNSSN|NNSSNNSS|                    7|NSSNNSSN|SSNNSSNN|
```

FIG.4A1 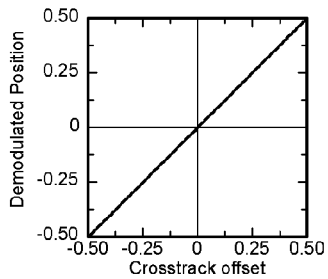
FIG.4A2 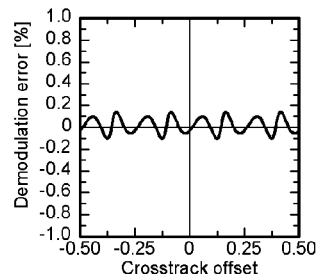
FIG.4A3 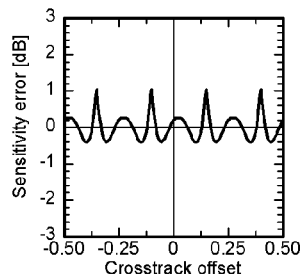
FIG.4B1 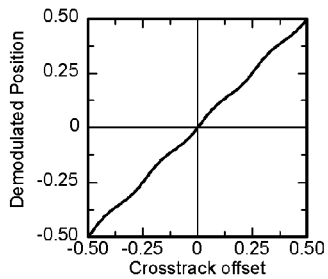
FIG.4B2 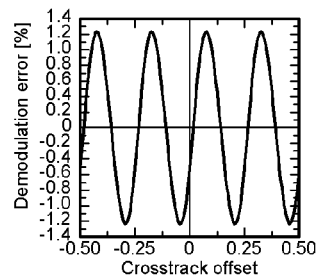
FIG.4B3 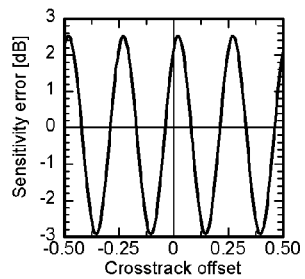
FIG.4C1 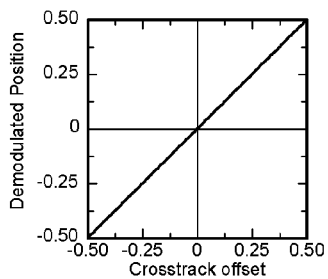
FIG.4C2 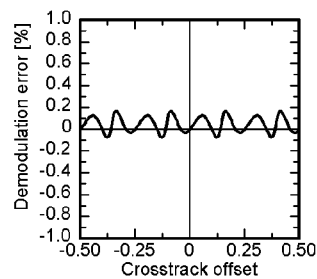
FIG.4C3 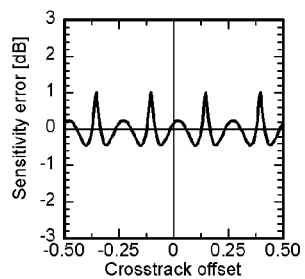
FIG.4D1 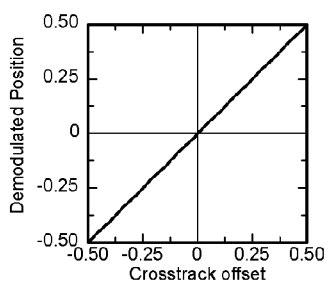
FIG.4D2 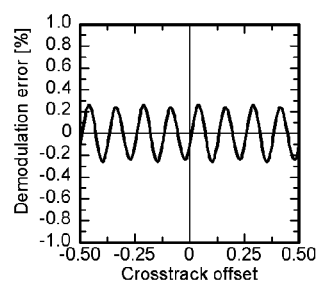
FIG.4D3 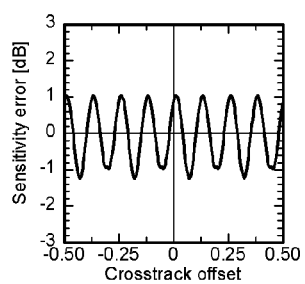

FIG.5A1 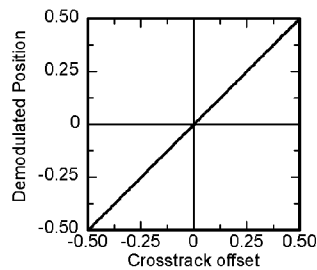
FIG.5A2 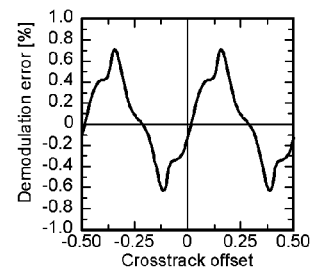
FIG.5A3 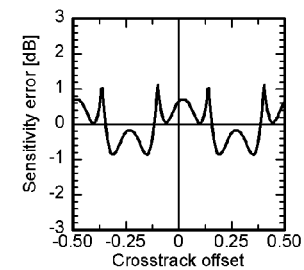
FIG.5B1 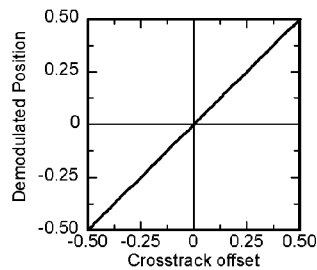
FIG.5B2 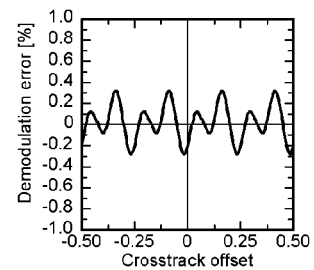
FIG.5B3 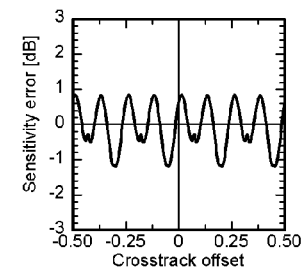
FIG.5C1 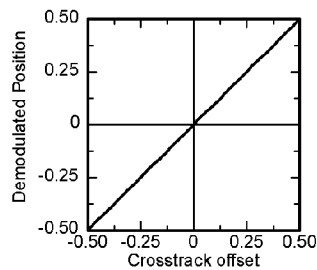
FIG.5C2 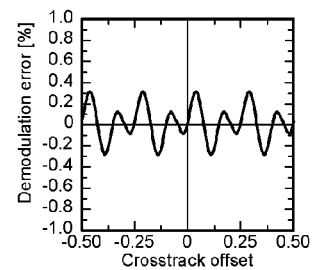
FIG.5C3 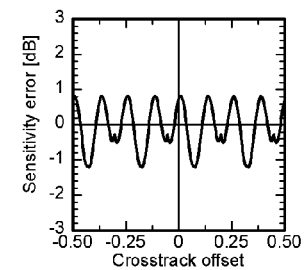

FIG.7A1 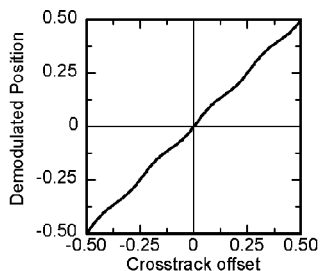
FIG.7A2 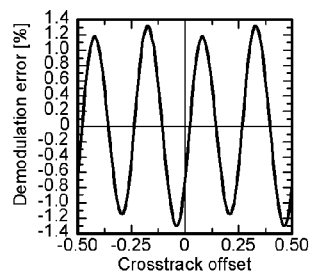
FIG.7A3 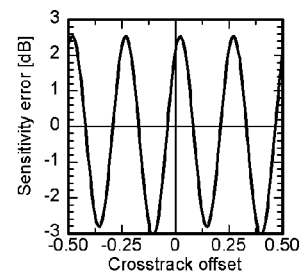
FIG.7B1 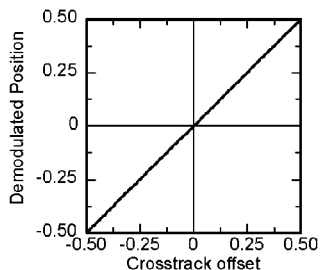
FIG.7B2 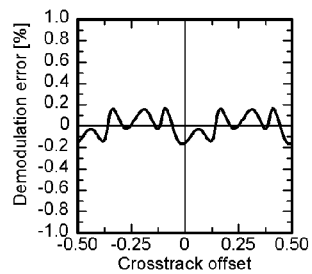
FIG.7B3 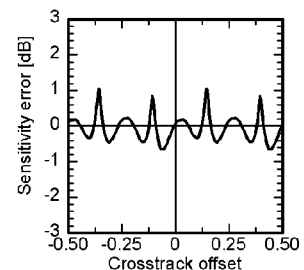
FIG.7C1 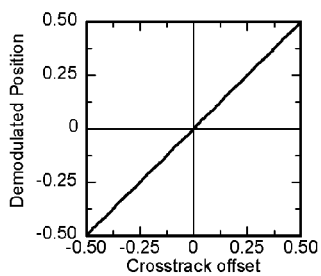
FIG.7C2 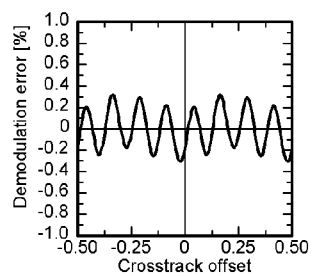
FIG.7C3 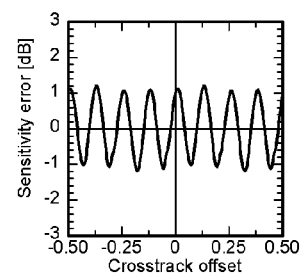
FIG.7D1 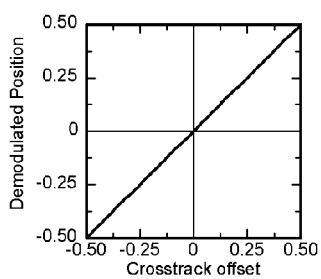
FIG.7D2 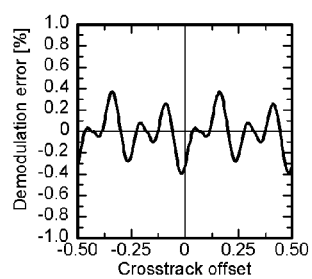
FIG.7D3 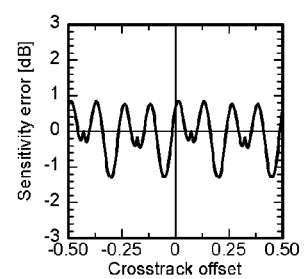

FIG.14A
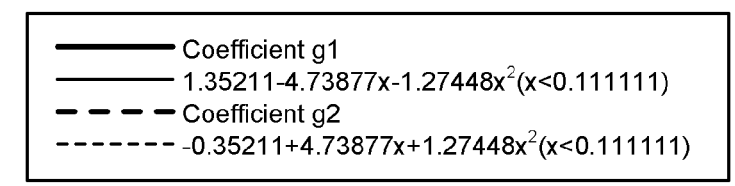
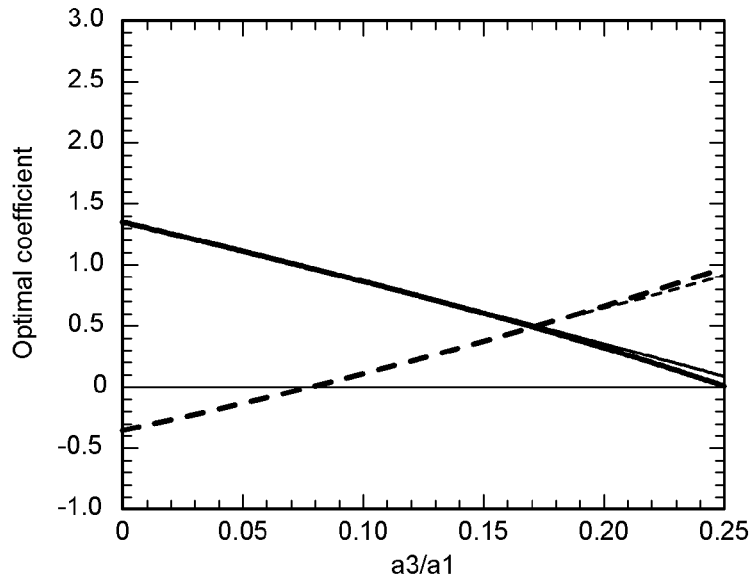
FIG.14B
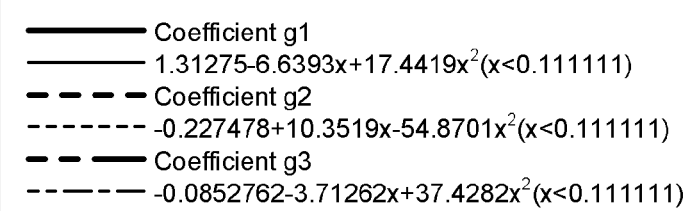
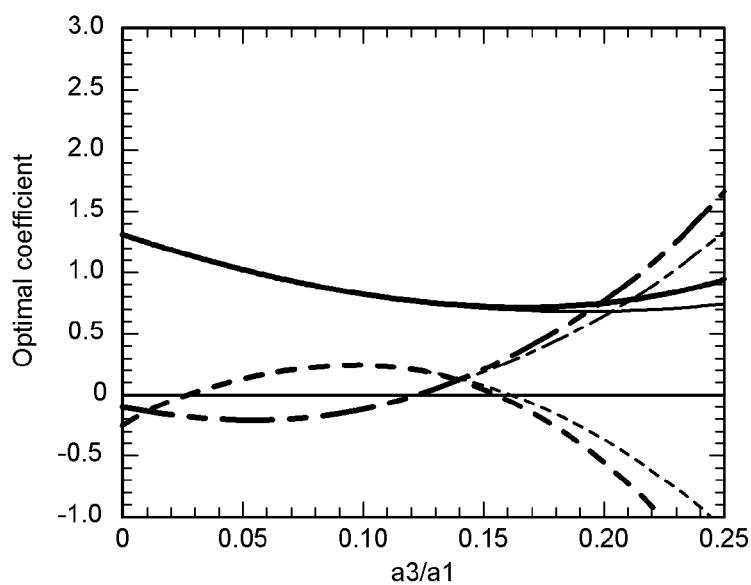

FIG.15

| 2n | m | SECOND-ORDER POLYNOMIAL CORRECTION $x=g_1r+g_2r^2$, $g_1+g_2=1$ | | | THIRD-ORDER POLYNOMIAL CORRECTION $x=g_1r+g_2r^2+g_3r^3$, $g_1+g_2+g_3=1$ | | | | | |
|---|---|---|---|---|---|---|---|---|---|---|
| | | $g_2=c_{20}+c_{21}(a_m/a_1)+c_{22}(a_m/a_1)^2$ | | | $g_2=c_{20}+c_{21}(a_m/a_1)+c_{22}(a_m/a_1)^2$ | | | $g_3=c_{30}+c_{31}(a_m/a_1)+c_{32}(a_m/a_1)^2$ | | |
| | | $c_{20}$ | $c_{21}$ | $c_{22}$ | $c_{20}$ | $c_{21}$ | $c_{22}$ | $c_{30}$ | $c_{31}$ | $c_{32}$ |
| 8 | 3 | -0.345387 | 4.38634 | 2.9488 | -0.22965 | 9.9915 | -49.162 | -0.0828873 | -3.5030 | 33.693 |
| 12 | 5 | -0.143176 | 6.76358 | 9.9369 | -0.03902 | 10.4733 | -121.799 | -0.0709040 | -2.1325 | 82.000 |
| 16 | 7 | -0.078878 | 9.15129 | 23.2884 | -0.01172 | 12.0847 | -227.391 | -0.0452919 | -1.5581 | 152.373 |
| 8 | 7 | -0.347863 | -0.12625 | 2.7118 | -0.22836 | 30.4344 | 1.460 | -0.0835944 | -21.1689 | -4.367 |

FIG.16

| 2n | m | SECOND-ORDER POLYNOMIAL CORRECTION $x=g_1r+g_2r^2$, $g_1+g_2=1$ | | | THIRD-ORDER POLYNOMIAL CORRECTION $x=g_1r+g_2r^2+g_3r^3$, $g_1+g_2+g_3=1$ | | | | | |
|---|---|---|---|---|---|---|---|---|---|---|
| | | $g_2=c_{20}+c_{21}(a_m/a_1)+c_{22}(a_m/a_1)^2$ | | | $g_2=c_{20}+c_{21}(a_m/a_1)+c_{22}(a_m/a_1)^2$ | | | $g_3=c_{30}+c_{31}(a_m/a_1)+c_{32}(a_m/a_1)^2$ | | |
| | | $c_{20}$ | $c_{21}$ | $c_{22}$ | $c_{20}$ | $c_{21}$ | $c_{22}$ | $c_{30}$ | $c_{31}$ | $c_{32}$ |
| 8 | 3 | -0.352110 | 4.73877 | 1.27448 | -0.227478 | 10.3519 | -54.8701 | -0.0852762 | -3.71262 | 37.4282 |
| 12 | 5 | -0.144747 | 7.26532 | 1.74536 | -0.038505 | 10.7630 | -137.9950 | -0.0714492 | -2.28514 | 92.5325 |
| 16 | 7 | -0.079445 | 9.76223 | 2.17402 | -0.011569 | 12.3264 | -258.4390 | -0.0454605 | -1.67060 | 172.5740 |
| 8 | 7 | -0.352829 | -0.61974 | 2.79512 | -0.225162 | 36.1418 | 3.7509 | -0.0866460 | -24.96540 | -5.5772 |

FIG.17

| 2n | m | SECOND-ORDER POLYNOMIAL CORRECTION $x=g_1r+g_2r^2$, $g_1+g_2=1$ | | | THIRD-ORDER POLYNOMIAL CORRECTION $x=g_1r+g_2r^2+g_3r^3$, $g_1+g_2+g_3=1$ | | | | | |
|---|---|---|---|---|---|---|---|---|---|---|
| | | $g_2=c_{20}+c_{21}(a_m/a_1)+c_{22}(a_m/a_1)^2$ | | | $g_2=c_{20}+c_{21}(a_m/a_1)+c_{22}(a_m/a_1)^2$ | | | $g_3=c_{30}+c_{31}(a_m/a_1)+c_{32}(a_m/a_1)^2$ | | |
| | | $c_{20}$ | $c_{21}$ | $c_{22}$ | $c_{20}$ | $c_{21}$ | $c_{22}$ | $c_{30}$ | $c_{31}$ | $c_{32}$ |
| 8 | 3 | -0.330193 | 3.3659 | 6.9219 | -0.229856 | 9.3823 | -44.239 | -0.074328 | -3.3767 | 30.569 |
| 12 | 5 | -0.241913 | 9.0844 | 50.7508 | -0.065979 | 16.6121 | -180.509 | -0.120532 | -3.3800 | 123.885 |
| 16 | 7 | -0.186090 | 17.1279 | 193.7270 | -0.027588 | 26.7015 | -464.957 | -0.108246 | -3.3446 | 318.300 |
| 8 | 7 | -0.333379 | 0.0230 | -1.3818 | -0.226532 | 16.6047 | 239.429 | -0.076556 | -12.0766 | -114.596 |

FIG.18

| 2n | m | SECOND-ORDER POLYNOMIAL CORRECTION $x=g_1r+g_2r^2$, $g_1+g_2=1$ | | | THIRD-ORDER POLYNOMIAL CORRECTION $x=g_1r+g_2r^2+g_3r^3$, $g_1+g_2+g_3=1$ | | | | | |
|---|---|---|---|---|---|---|---|---|---|---|
| | | $g_2=c_{20}+c_{21}(a_m/a_1)+c_{22}(a_m/a_1)^2$ | | | $g_2=c_{20}+c_{21}(a_m/a_1)+c_{22}(a_m/a_1)^2$ | | | $g_3=c_{30}+c_{31}(a_m/a_1)+c_{32}(a_m/a_1)^2$ | | |
| | | $c_{20}$ | $c_{21}$ | $c_{22}$ | $c_{20}$ | $c_{21}$ | $c_{22}$ | $c_{30}$ | $c_{31}$ | $c_{32}$ |
| 8 | 3 | -0.381193 | 5.9628 | -6.3997 | -0.250951 | 12.0437 | -74.567 | -0.072306 | -4.78471 | 50.906 |
| 12 | 5 | -0.261127 | 15.1099 | -49.2612 | -0.067910 | 20.2811 | -320.227 | -0.124167 | -4.83824 | 215.328 |
| 16 | 7 | -0.194359 | 26.8841 | -136.1560 | -0.027506 | 31.5382 | -837.389 | -0.110746 | -4.73216 | 556.317 |
| 8 | 7 | -0.367418 | -5.1046 | 23.4968 | -0.258958 | 48.8180 | -667.769 | -0.068586 | -32.05870 | 445.927 |

FIG.26A1
FIG.26A2
FIG.26A3
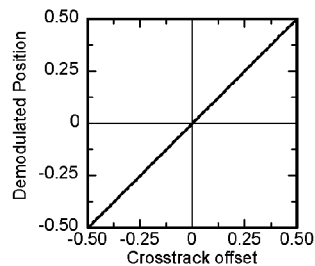 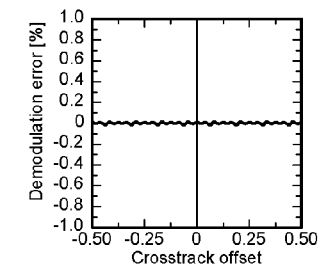 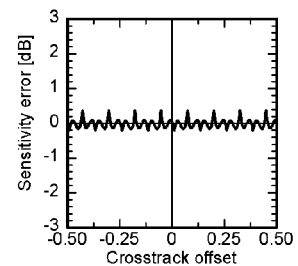
FIG.26B1
FIG.26B2
FIG.26B3
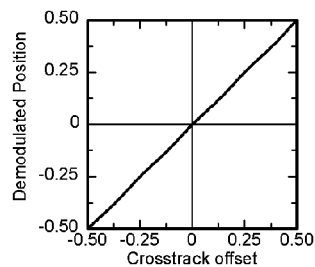 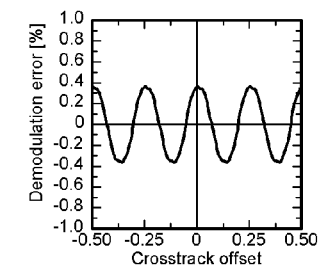 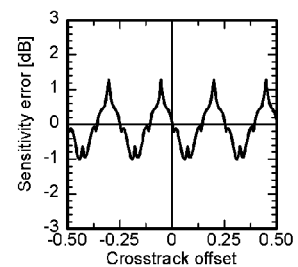
FIG.26C1
FIG.26C2
FIG.26C3
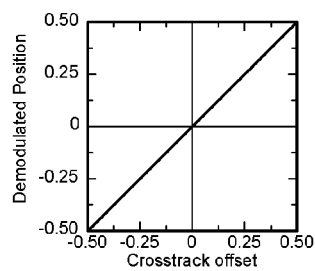 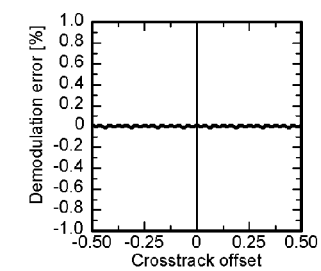 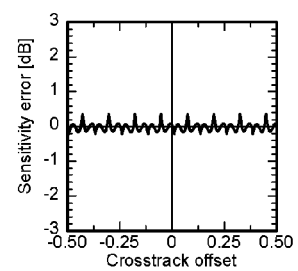
FIG.26D1
FIG.26D2
FIG.26D3
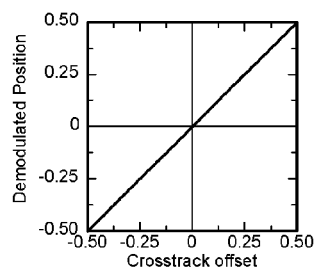 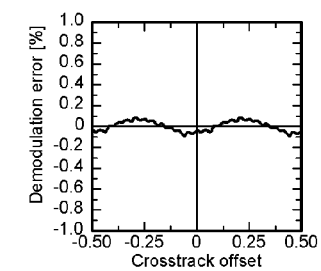 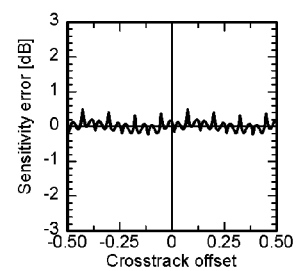

FIG.27A1 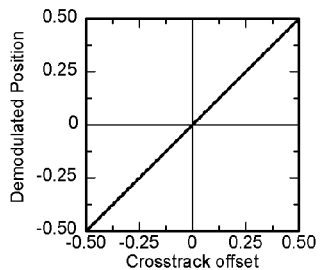 FIG.27A2 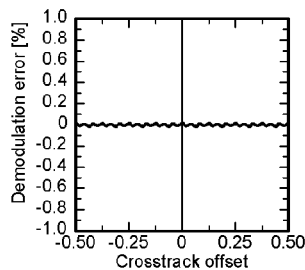 FIG.27A3 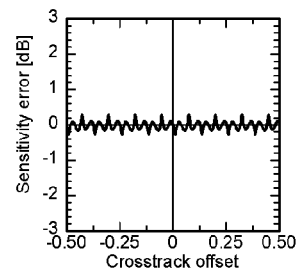
FIG.27B1 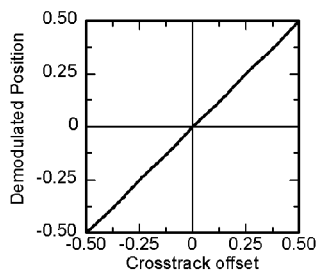 FIG.27B2 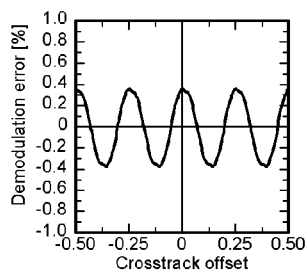 FIG.27B3 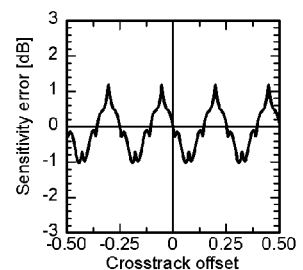
FIG.27C1 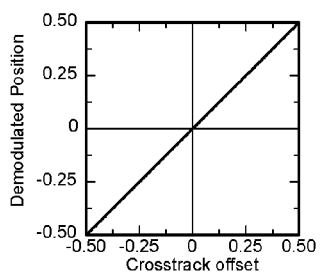 FIG.27C2 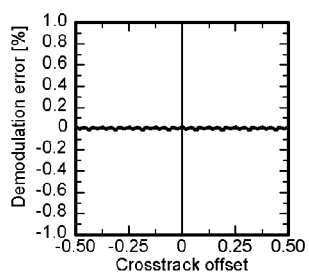 FIG.27C3 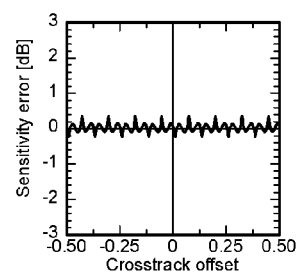
FIG.27D1 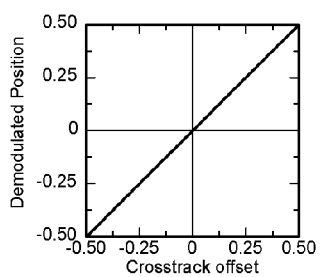 FIG.27D2 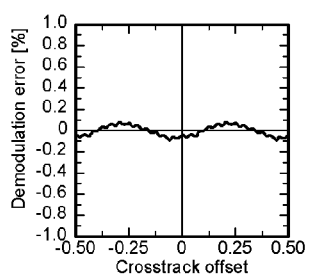 FIG.27D3 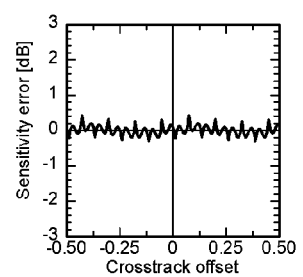

FIG.28A1 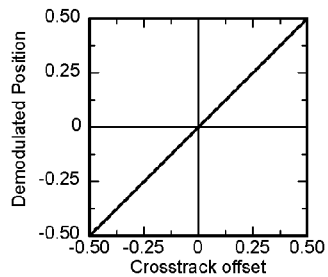
FIG.28A2 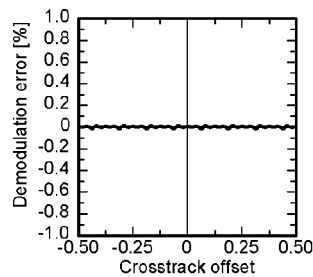
FIG.28A3 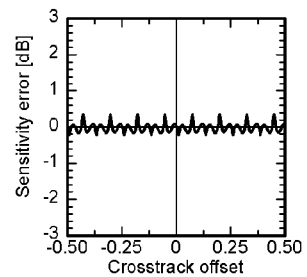
FIG.28B1 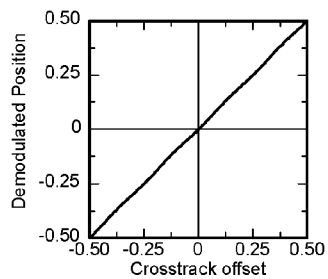
FIG.28B2 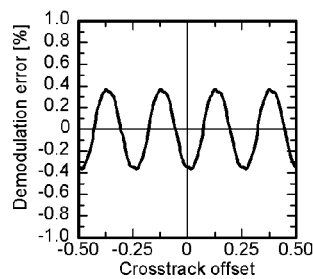
FIG.28B3 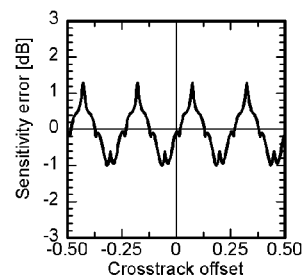
FIG.28C1 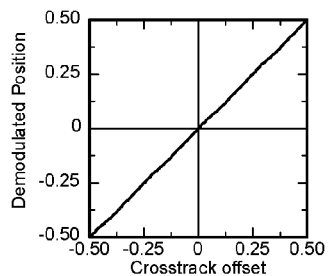
FIG.28C2 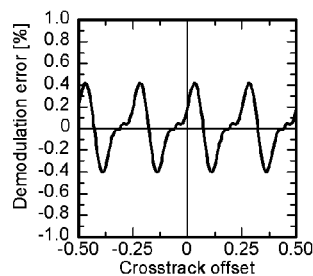
FIG.28C3 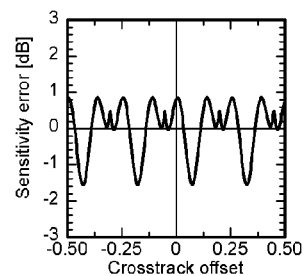
FIG.28D1 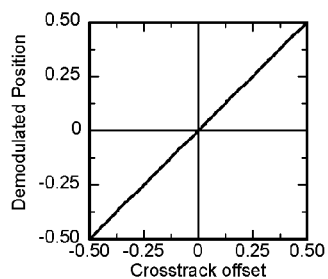
FIG.28D2 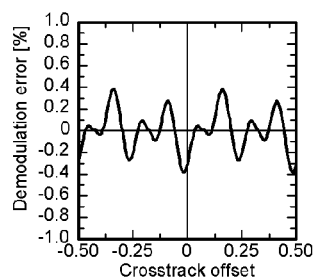
FIG.28D3 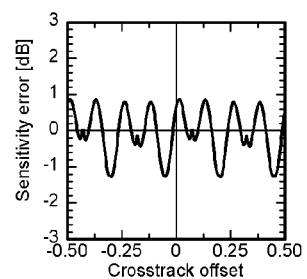

FIG.29A1
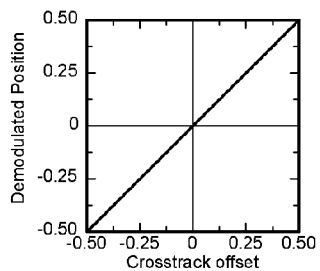
FIG.29A2
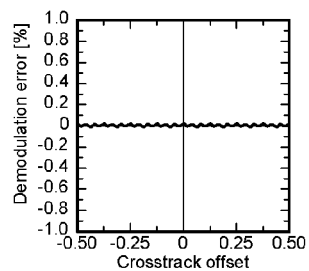
FIG.29A3
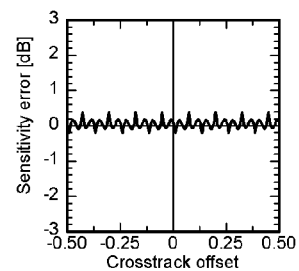
FIG.29B1
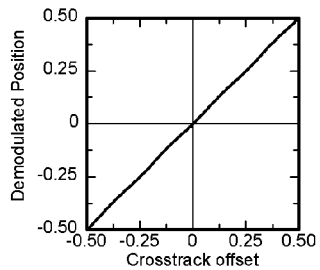
FIG.29B2
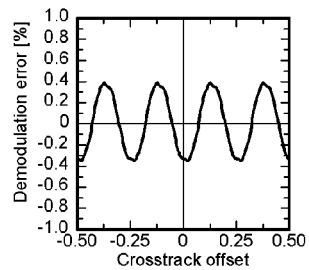
FIG.29B3
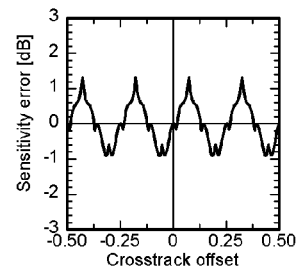
FIG.29C1
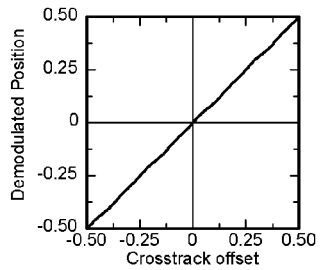
FIG.29C2
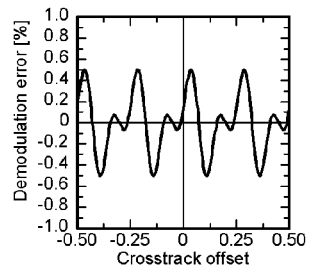
FIG.29C3
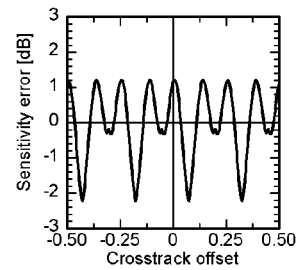
FIG.29D1
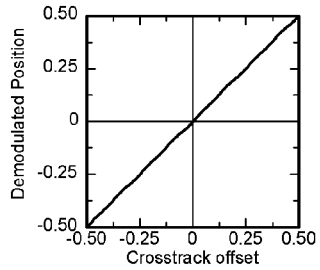
FIG.29D2
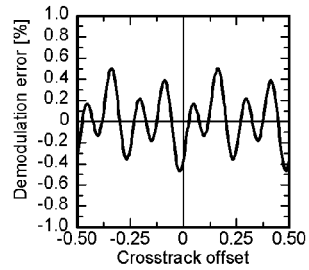
FIG.29D3
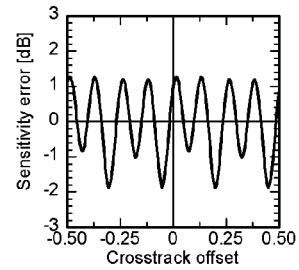

FIG.30A
```
k|    A          |    B          |
0|NNNSSSNNNSSS|SSSNNNSSSNNN|
1|SNNNSSSNNNSS|SSNNNSSSNNNS|
2|SSNNNSSSNNNS|SNNNSSSNNNSS|
3|SSSNNNSSSNNN|NNNSSSNNNSSS|
4|NSSSNNNSSSNN|NNSSSNNNSSSN|
5|NNSSSNNNSSSN|NSSSNNNSSSNN|
```
FIG.30B1
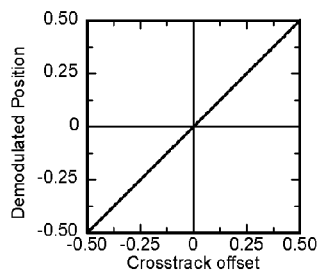
FIG.30B2
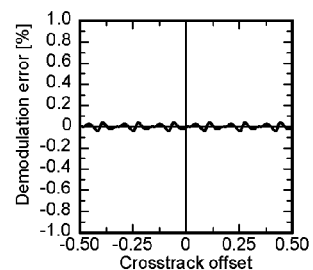
FIG.30B3
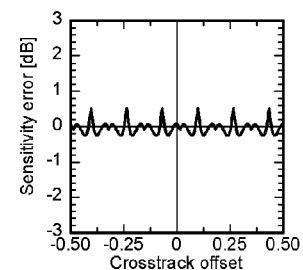
FIG.30C1
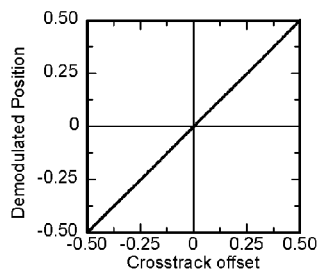
FIG.30C2
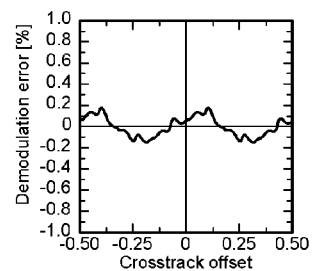
FIG.30C3
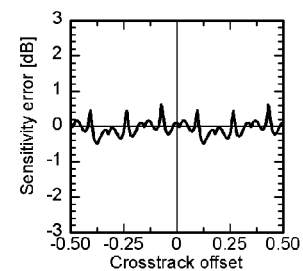

FIG.31A
```
k|      A           |      B           |
0|NNNNSSSSNNNNSSSS|SSSSNNNNSSSSNNNN|
1|SNNNNSSSSNNNNSSS|SSSNNNNSSSSNNNNS|
2|SSNNNNSSSSNNNNSS|SSNNNNSSSSNNNNSS|
3|SSSNNNNSSSSNNNNS|SNNNNSSSSNNNNSSS|
4|SSSSNNNNSSSSNNNN|NNNNSSSSNNNNSSSS|
5|NSSSSNNNNSSSSNNN|NNNSSSSNNNNSSSSN|
6|NNSSSSNNNNSSSSNN|NNSSSSNNNNSSSSNN|
7|NNNSSSSNNNNSSSSN|NSSSSNNNNSSSSNNN|
```
FIG.31B1
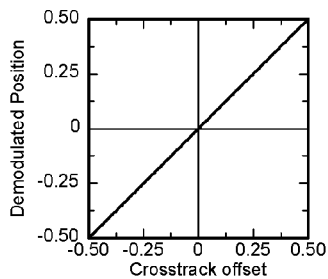
FIG.31B2
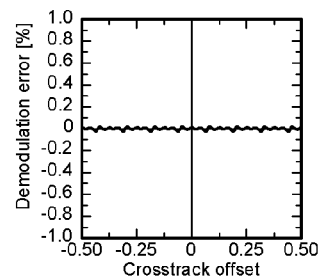
FIG.31B3
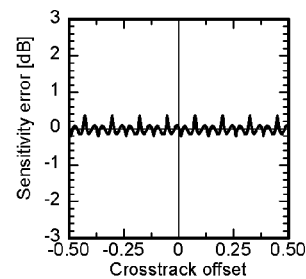
FIG.31C1
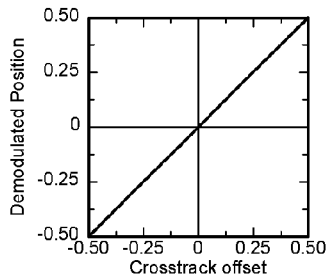
FIG.31C2
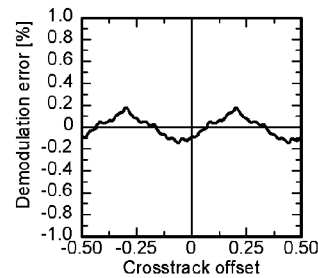
FIG.31C3
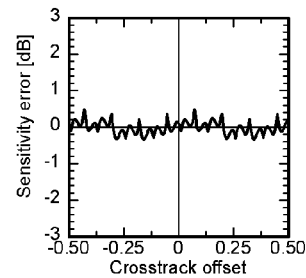

HEAD POSITION DEMODULATION METHOD AND MAGNETIC DISK DEVICE

CROSS-REFERENCE TO RELATED APPLICATIONS

This application is based upon and claims the benefit of priority from Provisional Patent Application No. 61/908,291, filed on Nov. 25, 2013; the entire contents of which are incorporated herein by reference.

FIELD

Embodiments described herein relate generally to a head position demodulation method and a magnetic disk device.

BACKGROUND

At a magnetic disk device, burst data indicative of position information on a track is retrieved together with sector and cylinder numbers in servo data, and a magnetic head is positioned based on the information. Typical burst patterns include a null-type burst pattern and a phase pattern. The null-type burst pattern can be defined as "ns=2, $\Delta\phi$=180°". The phase pattern can be generally defined as "ns=arbitrary number, $\Delta\phi$<180°" and can be practically defined as "ns=1 or 2, $\Delta\phi \leq 90°$, and a value which is a result of having divided 360° by a integer, where ns denotes an interval of magnetization change counted in STW step and $\Delta\phi$ denotes an adjacent phase difference. The phase pattern is demodulated mainly using an a tan(arctangent) demodulation technique. The null-type burst pattern is not demodulated using an a tan demodulation technique because of insufficient linearity, and thus is demodulated using a polynomial demodulation technique or the like so as to improve linearity.

BRIEF DESCRIPTION OF THE DRAWINGS

FIG. 2A is a plane view of an arrangement of tracks in the magnetic disk illustrated in FIG. 1, and FIG. 2B is a diagram of a configuration example of a servo area illustrated in FIG. 2A;

FIG. 3A is a diagram of a polarity arrangement in a burst pattern according to a first comparative example, FIG. 3B is a diagram of a polarity arrangement in a burst pattern according to a second comparative example, FIG. 3C is a diagram of a polarity arrangement in a burst pattern according to a first example, FIG. 3D is a diagram of a polarity arrangement in a burst pattern according to a second example, FIG. 3E is a diagram of a polarity arrangement in a burst pattern according to a third example, FIG. 3F is a diagram of a polarity arrangement in a burst pattern according to a fourth example, FIG. 3G is a diagram of a polarity arrangement in a burst pattern according to a fifth example, and FIG. 3H is a diagram of a polarity arrangement in a burst pattern according to a sixth example;

FIGS. 4A1 to 4A3 are diagrams of demodulated positions, demodulation errors, and sensitivity errors in the burst pattern illustrated in FIG. 3A with no phase shift nor frequency drift, FIGS. 4B1 to 4B3 are diagrams of demodulated positions, demodulation errors, and sensitivity errors in the burst pattern illustrated in FIG. 3B with no phase shift or frequency drift, FIGS. 4C1 to 4C3 are diagrams of demodulated positions, demodulation errors, and sensitivity errors in the burst patterns illustrated in FIGS. 3C to 3F with no phase shift or frequency drift, and FIGS. 4D1 to 4D3 are diagrams of demodulated positions, demodulation errors, and sensitivity errors in the burst patterns illustrated in FIGS. 3G to 3H with no phase shift or frequency drift;

FIGS. 5A1 to 5A3 are diagrams of demodulated positions, demodulation errors, and sensitivity errors in the burst pattern illustrated in FIG. 3A with a phase shift in B-phase and with no frequency drift, FIGS. 5B1 to 5B3 are diagrams of demodulated positions, demodulation errors, and sensitivity errors in the burst pattern illustrated in FIG. 3G with a phase shift in B-phase and with no frequency drift, and FIGS. 5C1 to 5C3 are diagrams of demodulated positions, demodulation errors, and sensitivity errors in the burst pattern illustrated in FIG. 3H with a phase shift in B-phase and with no frequency drift;

FIGS. 7A1 to 7A3 are diagrams of demodulated positions, demodulation errors, and sensitivity errors in the burst pattern illustrated in FIG. 3B with no phase shift and with a frequency drift, FIGS. 7B1 to 7B3 are diagrams of demodulated positions, demodulation errors, and sensitivity errors in the burst patterns illustrated in FIGS. 3D and 3F with no phase shift and with a frequency drift, FIGS. 7C1 to 7C3 are diagrams of demodulated positions, demodulation errors, and sensitivity errors in the burst pattern illustrated in FIG. 3G with no phase shift and with a frequency drift, and FIGS. 7D1 to 7D3 are diagrams of demodulated positions, demodulation errors, and sensitivity errors in the burst pattern illustrated in FIG. 3H with no phase shift and with a frequency drift;

FIG. 14A is a diagram of linearity correction coefficients in the case of using a second-order polynomial according to a fifth embodiment, and FIG. 14B is a diagram of linearity correction coefficients in the case of using a third-order polynomial according to the fifth embodiment;

FIG. 15 is a diagram of second-order approximation coefficients of linearity correction coefficients with which the maximum value of one period of demodulation error is minimum according to a sixth embodiment;

FIG. 16 is a diagram of second-order approximation coefficients of linearity correction coefficients with which the root-mean-square value of one period of demodulation error is minimum according to the sixth embodiment;

FIG. 17 is a diagram of second-order approximation coefficients of linearity correction coefficients with which the maximum value of one period of absolute value of position sensitivity is minimum according to the sixth embodiment;

FIG. 18 is a diagram of second-order approximation coefficients of linearity correction coefficients with which the root-mean-square value of one period of absolute value of position sensitivity is minimum according to the sixth embodiment;

FIGS. 26A1 to 26A3 are diagrams of demodulated positions, demodulation errors, and sensitivity errors in a case of executing a linearity correction using a second-order polynomial in the burst pattern illustrated in FIG. 3G with no phase shift nor frequency drift, FIGS. 26B1 to 26B3 are diagrams of demodulated positions, demodulation errors, and sensitivity errors in a case of executing a linearity correction using a second-order polynomial in the burst pattern illustrated in FIG. 3G with a phase shift in B-phase and with no frequency drift, FIGS. 26C1 to 26C3 are diagrams of demodulated positions, demodulation errors, and sensitivity errors in a case of executing a linearity correction using a second-order polynomial in the burst pattern illustrated in FIG. 3G with phase shifts in A- and B-phases and with no frequency drift, and FIGS. 26D1 to 26D3 are diagrams of demodulated positions, demodulation errors, and sensitivity errors in a case of executing a linearity correction using a second-order polynomial in the burst pattern illustrated in FIG. 3G with no phase shift and with a frequency drift;

FIGS. 27A1 to 27A3 are diagrams of demodulated positions, demodulation errors, and sensitivity error in a case of executing a linearity correction using a third-order polynomial in the burst pattern illustrated in FIG. 3G with no phase shift nor frequency drift, FIGS. 27B1 to 27B3 are diagrams of demodulated positions, demodulation errors, and sensitivity errors in a case of executing a linearity correction using a third-order polynomial in the burst pattern illustrated in FIG. 3G with a phase shift in B-phase and with no frequency drift, FIGS. 27C1 to 27C3 are diagrams of demodulated positions, demodulation errors, and sensitivity errors in a case of executing a linearity correction using a third-order polynomial in the burst pattern illustrated in FIG. 3G with phase shifts in A- and B-phases and with no frequency drift, and FIGS. 27D1 to 27D3 are diagrams of demodulated positions, demodulation errors, and sensitivity errors in a case of executing a linearity correction using a third-order polynomial in the burst pattern illustrated in FIG. 3G with no phase shift and with a frequency drift;

FIGS. 28A1 to 28A3 are diagrams of demodulated positions, demodulation errors, and sensitivity errors in a case of executing a linearity correction using a second-order polynomial in the burst pattern illustrated in FIG. 3H with no phase shift nor frequency drift, FIGS. 28B1 to 28B3 are diagrams of demodulated positions, demodulation errors, and sensitivity errors in a case of executing a linearity correction using a second-order polynomial in the burst pattern illustrated in FIG. 3H with a phase shift in B-phase and with no frequency drift, FIGS. 28C1 to 28C3 are diagrams of demodulated positions, demodulation errors, and sensitivity errors in a case of executing a linearity correction using a second-order polynomial in the burst pattern illustrated in FIG. 3H with phase shifts in A- and B-phases and with no frequency drift, and FIGS. 28D1 to 28D3 are diagrams of demodulated positions, demodulation errors, and sensitivity errors in a case of executing a linearity correction using a second-order polynomial in the burst pattern illustrated in FIG. 3H with no phase shift and with a frequency drift;

FIGS. 29A1 to 29A3 are diagrams of demodulated positions, demodulation errors, and sensitivity errors in a case of executing a linearity correction using a third-order polynomial in the burst pattern illustrated in FIG. 3H with no phase shift nor frequency drift, FIGS. 29B1 to 29B3 are diagrams of demodulated positions, demodulation errors, and sensitivity errors in a case of executing a linearity correction using a third-order polynomial in the burst pattern illustrated in FIG. 3H with a phase shift in B-phase and with no frequency drift, FIGS. 29C1 to 29C3 are diagrams of demodulated positions, demodulation errors, and sensitivity errors in a case of executing a linearity correction using a third-order polynomial in the burst pattern illustrated in FIG. 3H with phase shifts in A- and B-phases and with no frequency drift, and FIGS. 29D1 to 29D3 are diagrams of demodulated positions, demodulation errors, and sensitivity errors in a case of executing a linearity correction using a third-order polynomial in the burst pattern illustrated in FIG. 3H with no phase shift and with a frequency drift;

FIG. 30A is a diagram of a polarity arrangement in a burst pattern according to an eleventh embodiment, FIGS. 30B1 to 30B3 are diagrams of demodulated positions, demodulation errors, and sensitivity errors in a case of executing a linearity correction using a second-order polynomial in the burst pattern illustrated in FIG. 3A with no frequency drift, and FIGS. 30C1 to 30C3 are diagrams of demodulated positions, demodulation errors, and sensitivity errors in a case of executing a linearity correction using a second-order polynomial in the burst pattern illustrated in FIG. 30A with a frequency drift; and FIG. 31A is a diagram of a polarity arrangement in a burst pattern according to a twelfth embodiment, FIGS. 31B1 to 31B3 are diagrams of demodulated positions, demodulation errors, and sensitivity errors in a case of executing a linearity correction using a second-order polynomial in the burst pattern illustrated in FIG. 31A with no frequency drift, and FIGS. 31C1 to 31C3 are diagrams of demodulated positions, demodulation errors, and sensitivity errors in a case of executing a linearity correction using a second-order polynomial in the burst pattern illustrated in FIG. 30A with a frequency drift.

DETAILED DESCRIPTION

In general, according to one embodiment, at demodulation of an A-phase burst pattern and a B-phase burst pattern arranged in a down-track direction so as to be different in phase in a cross-track direction, the demodulated position of a magnetic head is calculated based on a sin component and a cos component of the A-phase burst pattern and a sin component and a cos component of the B-phase burst pattern.

Exemplary embodiments of a head position demodulation method and a magnetic disk device will be explained below in detail with reference to the accompanying drawings. The present invention is not limited to the following embodiments.

First Embodiment

Figure 1:
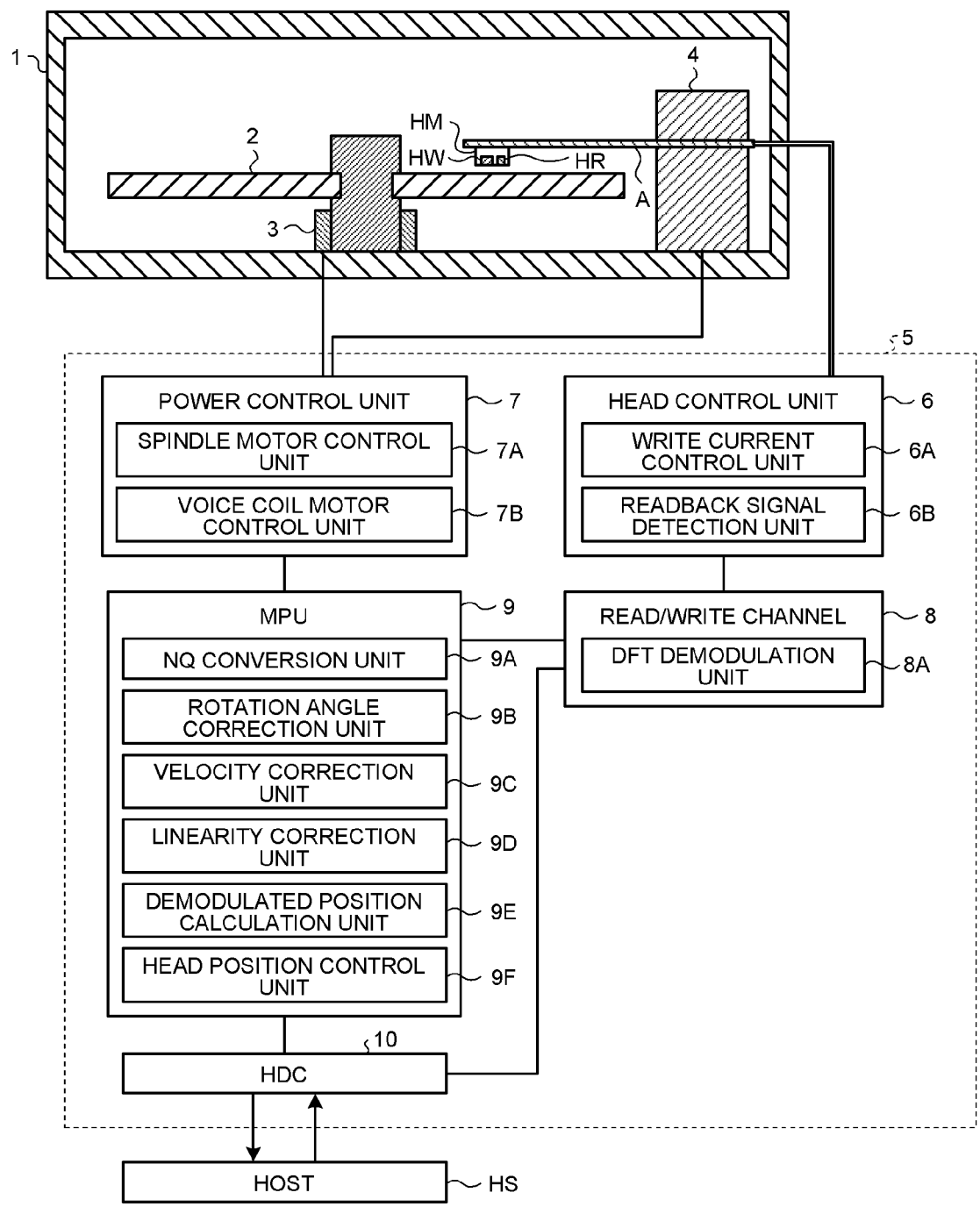
FIG. 1 is a schematic block diagram of a configuration of a magnetic disk device according to a first embodiment.

FIG. 1 is a schematic block diagram of a configuration of a magnetic disk device according to a first embodiment, FIG. 2A is a plane view of an arrangement of tracks in the magnetic disk illustrated in FIG. 1, and FIG. 2B is a diagram of a configuration example of a servo area illustrated in FIG. 2A.

Referring to FIG. 1, the magnetic disk device includes a magnetic disk 2 supported by a spindle motor 3. The magnetic disk device also includes a head slider HM with a write head HW and a read head HR as magnetic heads. The write head HW and the read head HR are opposite to the magnetic disk 2. In this arrangement, the head slider HM is held above the magnetic disk 2 by an arm A. The arm A allows the head slider HM to slide in a horizontal plane for seeking and the like.

As illustrated in FIGS. 2A and 2B, the magnetic disk 2 is provided with tracks T along a down-track direction D2. Each of the tracks T includes data area DA into which user data is to be written and servo area SS in which servo data is written. In this arrangement, the servo areas SS are radially arranged, and the data areas DA are arranged between the servo areas SS in the down-track direction D2. Written in the servo areas SS are preambles 20, servo marks 21, sector/cylinder information (Gray code) 22, and burst patterns 23 as illustrated in FIG. 2B. The sector/cylinder information 22 can provide servo addresses of the magnetic disk 2 in a circumferential direction and a radius direction, and can be used for seek control under which the read head HR is moved to a target track. The burst patterns 23 can be used for tracking control under which the read head HR is positioned within a target range of a target track. The burst patterns 23 can also be used for seek control. These servo data may be recorded in the magnetic disk 2 through self-servo writing or by the use of a dedicated servo track writer. Alternatively, the burst patterns 23 can be formed by magnetic printing, or lithography or nanoimprint for BPM (bit-patterned media) or DTM (discrete track media) or the like.

The burst patterns 23 may be phase patterns having an A-phase and a B-phase. In the A-phase and the B-phase, magnetization patterns can be arranged in the down-track direction D2 so as to be different in phase in the cross-track direction D1. In the following description, the A-phase and the B-phase may also be referred to as burst fields (A-phase as a burst field A and B-phase as a burst field B).

Returning to FIG. 1, the magnetic disk device includes a voice coil motor 4 for driving the arm A and a spindle motor 3 for rotating the magnetic disk 2. The magnetic disk 2, the head slider HM, the arm A, the voice coil motor 4, and the spindle motor 3 are stored in a case 1.

The magnetic disk device also includes a data control unit 5. The data control unit 5 has a head control unit 6, a power control unit 7, a read/write channel 8, an MPU (processor) 9, and an HDC 10. The data control unit 5 can calculate the demodulated position of the read head HR based on the burst patterns 23 read by the read head HR. At that time, the data control unit 5 can calculate the demodulated position of the read head HR based on a sin component and a cos component in the A-phase and a sin component and a cos component in the B-phase at demodulation of the burst pattern 23 read by the read head HR. On demodulation of a null-type burst pattern, two components, that is, a sin component or a cos component in the A-phase and a sin component or a cos component in the B-phase are used. Meanwhile, on demodulation of a phase pattern, four components, that is, a sin component and a cos component in the A-phase and a sin component and a cos component in the B-phase are used.

The head control unit 6 has a write current control unit 6A and a readback signal detection unit 6B. The power control unit 7 has a spindle motor control unit 7A and a voice coil motor control unit 7B. The read/write channel 8 has a DFT (Discrete Fourier Transform) demodulation unit 8A. The MPU has an NQ conversion unit 9A, a rotation angle correction unit 9B, a velocity correction unit 9C, a linearity correction unit 9D, a demodulated position calculation unit 9E, and a head position control unit 9F.

The head control unit 6 can amplify and detect a signal at writing or reading. The write current control unit 6A can control a write current flowing in the write head HW. The readback signal detection unit 6B can detect a signal read by the read head HR.

The power control unit 7 can drive the voice coil motor 4 and the spindle motor 3. The spindle motor control unit 7A can control rotation of the spindle motor 3. The voice coil motor control unit 7B can control driving of the voice coil motor 4.

The read/write channel 8 can pass and receive data to/from the head control unit 6, the MPU 9, and the HDC 10. The data includes read data, write data, and servo data. For example, the read/write channel 8 and the HDC 10 can convert a signal read at the read head HR into a data format handled by a host HS, or convert data output from the host HS into a signal format recorded in the write head HW. The read/write channel 8 and the HDC 10 can also decode a signal read at the read head HR and encode data from the host HS. The DFT demodulation unit 8A can extract fundamental components from a signal read from the burst pattern 23 by the read head HR and subjected to a DFT operation. The fundamental components includes a sin component and a cos component in the A-phase and a sin component and a cos component in the B-phase of the burst pattern 23.

The MPU 9 performs head positioning control including position signal demodulation. The NQ conversion unit 9A determines biphase signals N and Q based on the sin component and the cos component in the A-phase and the sin component and the cos component in the B-phase at reading of the burst pattern 23. In the following description, a curved line representing on an XY plane the relationship between the biphase signals N and Q will be referred to as NvsQ Lissajous. The rotation angle correction unit 9B rotates the NvsQ Lissajous of the fundamental components of the burst pattern 23 by a predetermined angle, thereby to reduce the inclination of the NvsQ Lissajous deformed in a rectangular shape depending on the reading position of the burst pattern 23 on the magnetic disk 2. The velocity correction unit 9C performs velocity compensation to decrease the oblateness of the NvsQ Lissajous of the fundamental components of the burst pattern 23 read by the read head HR. Specifically, the velocity correction unit 9C corrects the phases of the fundamental components of the burst pattern 23 such that the NvsQ Lissajous deformed in an elliptic shape due to seeking becomes closer to a circular shape. The linearity correction unit 9D corrects an arithmetic expression for determining the position of the read head HR from the fundamental components of the burst pattern 23 to improve the linearity of changes in the position of the read head HR with respect to changes in the fundamental components of the burst pattern 23. In the following description, the correction will be referred to as linearity correction. The demodulated position calculation unit 9E calculates the demodulated position of the read head HR based on the fundamental components of the burst pattern 23. The head position control unit 9F controls the position of the read head HR through the voice coil motor control unit 7B based on the calculation result of the demodulated position of the read head HR. The HDC 10 passes and receives data to/from the host HS and the read/write channel 8. The host HS may be a computer issuing a write command and a read command and the like to the magnetic disk device or may be an external interface.

Operations of the magnetic disk device illustrated in FIG. 1 will be described below.

While the magnetic disk 2 is rotated by the spindle motor 3, a signal is read from the magnetic disk 2 via the read head HR and detected by the readback signal detection unit 6B. The signal detected by the readback signal detection unit 6B is converted by the read/write channel 8 to signal data and then sent to the processor 9. On the signal data conversion, the DFT demodulation unit 8A performs a DFT operation on the signal read from the burst pattern 23 by the read head HR to extract the sin component and the cos component in the A-phase and the sin component and the cos component in the B-phase from the burst pattern 23. Then, the processor 9 calculates the demodulated position of the read head HR based on the sin component and the cos component in the A-phase and the sin component and the cos component in the B-phase of the burst pattern 23 detected by the readback signal detection unit 6B.

At that time, the NQ conversion unit 9A calculates the biphase signals N and Q based on the sin component and the cos component in the A-phase and the sin component and the cos component in the B-phase at reading of the burst pattern 23.

The rotation angle correction unit 9B rotates the NvsQ Lissajous of the sin components in the N phase and the Q phase of the burst pattern 23 by a predetermined angle to eliminate the inclination of the NvsQ Lissajous deformed in a rectangular shape. At that time, initial phase shifts of complex Lissajous in the A-phase and the B-phase of the burst pattern 23 appears in NvsQ Lissajous, and thus initial phase correction of complex Lissajous can be performed on the initial phase shifts. On the initial phase correction, the complex Lissajous can be rotated by a predetermined angle to eliminate the inclination of the longer axis of the complex Lissajous in the A-phase and the B-phase of the burst pattern 23. The velocity correction unit 9C performs velocity compensation to decrease the oblateness of the NvsQ Lissajous in the N phase and the Q phase of the burst pattern 23. The velocity compensation makes it possible to correct the phase relation between the sin components in the N phase and the Q phase of the burst pattern 23. The linearity correction unit 9D corrects the arithmetic expression for determining the position of the read head HR from the fundamental components of the burst pattern 23 to improve linearity of changes in the position of the read head HR with respect to changes in the fundamental components of the burst pattern 23. The demodulated position calculation unit 9E uses the arithmetic expression corrected by the linearity correction unit 9D to calculate the demodulated position of the read head HR. Then, the head position control unit 9F controls the position of the read head HR based on the calculation result of the demodulated position of the read head HR.

By calculating the biphase signals N and Q based on the sin component and the cos component in the A-phase and the sin component and the cos component in the B-phase of the burst pattern 23, it is possible to, even in the case of using the phase pattern having the A-phase and the B-phase of the burst pattern 23, perform the linearity correction equivalent to that in a null-type burst pattern, thereby improving demodulation linearity (linearity of the demodulated position with respect to an offset in the cross-track direction D1).

By calculating the biphase signal N and Q based on the sin component and the cos component in the A-phase and the sin component and the cos component in the B-phase of the burst pattern 23, it is possible to perform initial phase correction at the time of rotation angle correction. This eliminates the need to measure separately parameters of the initial phase correction and the rotation angle correction. Accordingly, it is possible to reduce a work load in the calibration process as compared to the case of using a null-type burst pattern as the burst pattern 23.

By using the phase pattern with the A-phase and the B-phase as the burst pattern 23, it is possible to improve processing accuracy even in the case of forming the burst pattern 23 by lithography, nanoimprint, or the like, as compared to the case of forming a null-type burst pattern.

The method for calculating the biphase signals N and Q will be described below using equations.

If, in servo track writing (STW), the head position is designated as k (integer variable) in the cross-track direction D1 and as t in the down-track direction D2, the magnetization patterns in the burst fields A and B can be expressed as follows:

$$A(k,t)=\cos(\omega t+\theta a)$$

$$B(k,t)=\cos(\omega t+\theta b)$$

where $\theta a(k)=\theta ao+\phi(k)$, $\theta b(k)=\pm(\theta bo+\phi(k))$.

The plus sign attached to $\theta b$ indicates that phase shifts of the burst fields A and B are in the same direction (parallel), and the minus sign attached to $\theta b$ indicates that phase shifts of the burst fields A and B are in the opposite directions.

When the readback signal from the read head HR is subjected to a DFT operation with respect to angular frequency $\omega$ at an arbitrary position, four signals of cos component (cA) and sin component (sA) in the burst field A and cos component (cB) and sin component (sB) in the burst field B are obtained. If the cos component (cA) and the sin component (sA) in the burst field A are expressed as vector [cA; sA] and the cos component (cB) and the sin component (sB) in the burst field B are expressed as vector [cB; sB], the directions of the vectors [cA; sA] and [cB; sB] change depending on the position of the read head HR.

In the case of phase variations in the opposite directions, the vector [cB; sB] is reversed by a 2×2 matrix [1, 0; 0, −1], and then the vectors are multiplied by a 2×2 rotation matrix of:

$$[Ta]=[+\cos(\theta t-\theta ao),-\sin(\theta t-\theta ao);+\sin(\theta t-\theta ao),+\cos(\theta t-\theta ao)]$$

$$[Tb]=[+\cos(\theta t-\theta bo),-\sin(\theta t-\theta bo);+\sin(\theta t-\theta bo),+\cos(\theta t-\theta bo)]$$

to uniform the two vectors to the reference phases of $\theta t$, and the sum of the two vectors is calculated.

By the foregoing operations, in the case of patterns with phase shift in the same direction, the following equation is obtained:

$$[Ta][cA;sA]+[Tb][cB;sB]$$

In the case of patterns with phase shift in the opposite directions, the following equation is obtained:

$$[Ta][cA;sA]+[Tb][1,0;0,-1][cB;sB]$$

If it is defined as the result is designated as [N; Q] and $Vn=[+\cos(\theta t-\theta ao), -\sin(\theta t-\theta ao), +\cos(\theta t-\theta bo), -/+\sin(\theta t-\theta bo)]$ $$Vq=[+\sin(\theta t-\theta ao),+\cos(\theta t-\theta ao),+\sin(\theta t-\theta bo),+/-\cos(\theta t-\theta bo)],$$

$$[N;Q]=[Vn;Vq][cA;sA;cB;sB].$$

The foregoing operation is called "NQ conversion" since the cos components and the sin components in the burst fields A and B are converted to biphase signals N and Q.

If it is defined as $\Delta\theta o=\theta bo-\theta ao$, $\theta ab=(\theta ao+\theta bo)/2$, and $\theta abt=\theta t-\theta ab$, the following equations are obtained:

$$\theta t-\theta ao=\theta t-(\theta ao+\theta bo)/2+(\theta bo-\theta ao)/2=\theta t-\theta ab+\Delta\theta o/2=\theta abt+\Delta\theta o/2$$

$$\theta t-\theta bo=\theta t-(\theta ao+\theta bo)/2-(\theta bo-\theta ao)/2=\theta t-\theta ab-\Delta\theta o/2=\theta abt-\Delta\theta o/2.$$

Thus, $$Vn=[+\cos(\theta t-\theta ao),-\sin(\theta t-\theta ao),+\cos(\theta t-\theta bo),-/+\sin(\theta t-\theta bo)]$$

$$=[+\cos(\theta abt+\Delta\theta o/2),-\sin(\theta abt+\Delta\theta o/2),+\cos(\theta abt-\Delta\theta o/2),-/+\sin(\theta abt-\Delta\theta o/2)]$$

$$Vq=[+\sin(\theta t-\theta ao),+\cos(\theta t-\theta ao),+\sin(\theta t-\theta bo),+/-\cos(\theta t-\theta bo)]$$

$$=[+\sin(\theta abt+\Delta\theta o/2),+\cos(\theta abt+\Delta\theta o/2),+\sin(\theta abt-\Delta\theta o/2),+/-\cos(\theta abt-\Delta\theta o/2)].$$

If it is defined as:

$$ca=\cos(\theta abt+\Delta\theta o/2), sa=\sin(\theta abt+\Delta\theta o/2)$$

$$cb=\cos(\theta abt-\Delta\theta o/2), sb=\sin(\theta abt-\Delta\theta o/2)$$

the following equations are obtained:

$$Vn=[ca,-sa,+cb,-/+sb]$$

$$Vq=[sa,+ca,+sb,+/-cb]$$

Thus, $$N=(cA\cdot ca-sA\cdot sa+cB\cdot cb-/+sB\cdot sb)$$

$$Q=(cA\cdot sa+sA\cdot ca+cB\cdot sb+/-sB\cdot cb)$$

where −/+ is a minus-plus sign and +/− is a plus-minus sign.

The performance of a servo pattern can be evaluated mainly by:
  magnetization pattern period (space period) in the cross-track direction
  demodulation linearity (demodulation error, position sensitivity error)
  demodulation S/N
  immunity to (independence from) errors (accuracy) in magnetization pattern, sample clock, and the like.

The magnetization pattern period is equivalent to a demodulation distance range in which position determination can be made by a demodulated position error signal (PES).

The demodulation linearity is more favorable when the ratio (swTP/MRW) of an STW pitch (swTP) to a nominal read head sensitivity width (MRW) is smaller.

The demodulation S/N is almost proportional to the square root of the entire length (wave number) of the burst field, and is almost inversely proportional to the magnetization pattern period/MRW. However, when the pattern period is narrower close to the MRW, the amplitude of a readback signal in the burst field becomes smaller to deteriorate the demodulation S/N.

The foregoing items are in relationships as follows:

Magnetization pattern period=adjacent magnetization change distance×360°/adjacent phase difference ($\Delta\phi$)

STW pitch (swTP)=adjacent magnetization change distance/interval of magnetization change counted in STW step ($ns$)

The interval of magnetization change counted in STW step (ns) matches the number of field groups different in phase in the cross-track direction. Accordingly, when comparison is made in the same magnetization pattern period according to Gray code specifications and the like, the STW pitch is proportional to $\Delta\phi/ns$.

Actual Vn and Vq vectors will be described below for several burst patterns 23. In the following description, $\theta ao=\frac{1}{2}\pi$ to set the down-track magnetization pattern at k=0 as sin wave. In addition, for the sake of convenience, $7/4\pi$ is set to arbitrary reference phase $\theta t$.

FIG. 3A is a diagram of a polarity arrangement in a burst pattern according to a first comparative example, FIG. 3B is a diagram of a polarity arrangement in a burst pattern according to a second comparative example, FIG. 3C is a diagram of a polarity arrangement in a burst pattern according to a first example, FIG. 3D is a diagram of a polarity arrangement in a burst pattern according to a second example, FIG. 3E is a diagram of a polarity arrangement in a burst pattern according to a third example, FIG. 3F is a diagram of a polarity arrangement in a burst pattern according to a fourth example, FIG. 3G is a diagram of a polarity arrangement in a burst pattern according to a fifth example, and FIG. 3H is a diagram of a polarity arrangement in a burst pattern according to a sixth example.

FIG. 3A illustrates a null-type burst pattern as burst pattern 23 according to a first comparative example. In the null-type burst pattern, A- and B-phases have magnetization patterns arranged such that the polarities (N pole and S pole) are alternately reversed at intervals of 180 degrees (=1 cyl) in the cross-track direction D1. The A-phase and the B-phase are also arranged with a phase shift of 90 degree (=0.5 cyl) from each other at a boundary therebetween in the cross-track direction D1.

In the null-type burst pattern, if the sin component of a readback signal in the burst field A is designated as N and the sin component of a readback signal in the burst field B is designated as Q, it is possible to demodulate a position error signal (PES) using the biphase signals N and Q. However, since the STW pitch cannot be narrowed with respect to the magnetization pattern period, it is not possible to obtain sufficient linearity by a tan(N/Q) demodulation or the like. To obtain sufficient demodulation linearity in the null-type burst pattern, second-order polynomial $PES=g_1 \times r+g_2 \times r^2$, $g_1+g_2=1$, $r=|N/Q|$ or $|Q/N|$ can be used as a linearity correction function. Alternatively, second-order polynomial $PES = g_1 \times N/(|N|+|Q|) + g_2 \times N|N|/(N^2+Q^2)$, $g_1+g_2=1$ may be used. Otherwise, third-order polynomial $PES=g_1 \times r + g_2 \times r^2 + g_3 \times r^3$, $g_1+g_2+g_3=1$, where when N>Q, r=Q/N, or when N<Q, r=N/Q, as a linearity correction function. In the functions, $g_1$, $g_2$, and $g_3$ denote linearity correction coefficients.

FIG. 3B illustrates a phase-quadrature pattern (ns=1 or 2, $\Delta\phi=90°$) as burst pattern 23 according to a second comparative example. In the phase-quadrature pattern, if the sin component of a readback signal in the burst field A is designated as S1 and the cos component of the same as C1, the following equations for a demodulation method are obtained:

$$A = \text{sqrt}\{0.25[(S1+S2)^2 + (C1+C2)^2]\}$$

$$B = \text{sqrt}\{0.25[(S1-S2)^2 + (C1-C2)^2]\}$$

$$PES = A - B \text{ or } PES = a\tan(A/B)$$

FIG. 3C illustrates a phase pattern in which the burst fields A and B change in phase in the same direction in the down-track direction D2 and the AB phase difference is 90 degrees ($\Delta\theta o = \frac{1}{2}\pi$) as burst pattern 23.

In this phase pattern, if it is assumed that $\phi=\pi/2 \cdot k$, $\theta ao=\frac{1}{2}\pi$, and $\theta bo=2/2\pi$, the following equations are obtained:

$$Vn = [+\cos(5/4\pi), -\sin(5/4\pi), +\cos(3/4\pi), -\sin(3/4\pi)] = [-1, +1, -1, -1]/\sqrt{2}$$

$$Vq = [+\sin(5/4\pi), +\cos(5/4\pi), +\sin(3/4\pi), +\cos(3/4\pi)] = [-1, -1, +1, -1]/\sqrt{2}.$$

FIG. 3D illustrates a phase pattern in which the burst fields A and B change in phase in the same direction and the AB phase difference is 180 degrees ($\Delta\theta o = \pi$) as burst pattern 23.

In this phase pattern, if it is assumed that $\phi=\pi/2 \cdot k$, $\theta ao=\frac{1}{2}\pi$, and $\theta bo=3/2\pi$, the following equations are obtained:

$$Vn = [+\cos(5/4\pi), -\sin(5/4\pi), +\cos(\frac{1}{4}\pi), -\sin(\frac{1}{4}\pi)] = [-1, +1, +1, -1]/\sqrt{2}$$

$$Vq = [+\sin(5/4\pi), +\cos(5/4\pi), +\sin(\frac{1}{4}\pi), +\cos(\frac{1}{4}\pi)] = [-1, -1, +1, +1]/\sqrt{2}.$$

FIG. 3E illustrates a phase pattern in which the burst fields A and B change in phase in the opposite directions in the down-track direction D2 and the AB phase difference is ±90 degrees ($\Delta\theta o = \frac{1}{2}\pi$) as burst pattern 23.

In this phase pattern, if it is assumed that $\phi=\pi/2 \cdot k$, $\theta ao=\frac{1}{2}\pi$, and $\theta bo=2/2\pi$, the following equations are obtained:

$$Vn = [+\cos(5/4\pi), -\sin(5/4\pi), +\cos(3/4\pi), +\sin(3/4\pi)] = [-1, +1, -1, +1]/\sqrt{2}$$

$$Vq = [+\sin(5/4\pi), +\cos(5/4\pi), +\sin(3/4\pi), -\cos(3/4\pi)] = [-1, -1, +1, +1]/\sqrt{2}.$$

FIG. 3F illustrates a phase pattern in which the burst fields A and B change in phase in the opposite directions and the AB phase difference is 0 degree ($\Delta\theta o = 0$) as burst pattern 23.

In this phase pattern, if it is assumed that $\phi=\pi/2 \cdot k$, $\theta ao=\frac{1}{2}\pi$, and $\theta bo=\frac{1}{2}\pi$, the following equations are obtained:

$$Vn = [+\cos(5/4\pi), -\sin(5/4\pi), +\cos(5/4\pi), +\sin(5/4\pi)] = [-1, +1, -1, -1]/\sqrt{2}$$

$$Vq = [+\sin(5/4\pi), +\cos(5/4\pi), +\sin(5/4\pi), -\cos(5/4\pi)] = [-1, -1, -1, -1]/\sqrt{2}.$$

In the foregoing examples, the phases are shifted by 90 degrees at each STW step, and ns=1, $\Delta\phi=90°$.

In a general phase pattern, the phases are shifted by 45 degrees at each STW step, which requires a phase shift resolution for servo writing and thus causes an increased burst length in many cases. Accordingly, in fifth and sixth examples, the phases are shifted by 90 degrees at two STW steps each (ns=2, $\Delta\phi=90°$) to lengthen the magnetization pattern period. The period in the cross-track direction D1 is eight STW steps.

FIG. 3G illustrates a phase pattern in which the burst fields A and B change in phase in the same direction and the AB phase difference is 45 degrees ($\Delta\theta o = \frac{1}{4}\pi$) as burst pattern 23.

In this phase pattern, due to phase variations at two STW steps each, the following equations are obtained: $\theta a = \frac{1}{2}\pi \cdot (\text{int}(k/2)+1)$, and $\theta b = \frac{1}{2}\pi \cdot (\text{int}((k+1)/2)+1)$, but int( ) cannot be realized by the NQ conversion. Thus, int(k/2) is substituted by k/2 and int((k+1)/2) is substituted by k/2. In this case, the following equations are obtained:

$$\phi = \pi/4 \cdot k, \theta ao = \frac{1}{2}\pi, \theta bo = \frac{1}{2}\pi, \Delta\theta o = 0$$

$$Vn = [+\cos(5/4\pi), -\sin(5/4\pi), +\cos(5/4\pi), -\sin(5/4\pi)] = [-1, +1, -1, +1]/\sqrt{2}$$

$$Vq = [+\sin(5/4\pi), +\cos(5/4\pi), +\sin(5/4\pi), +\cos(5/4\pi)] = [-1, -1, -1, -1]/\sqrt{2}. \quad (5\text{-}1)$$

Meanwhile, if int(k/2) is substituted by k/2 and int((k+1)/2) is substituted by k/2+1, the following equations are obtained:

$$\phi = \pi/4 \cdot k, \theta ao = \frac{1}{2}\pi, \theta bo = 2/2\pi, \Delta\theta o = \frac{1}{2}\pi$$

$$Vn = [+\cos(5/4\pi), -\sin(5/4\pi), +\cos(3/4\pi), -\sin(3/4\pi)] = [-1, +1, -1, -1]/\sqrt{2}$$

$$Vq = [+\sin(5/4\pi), +\cos(5/4\pi), +\sin(3/4\pi), +\cos(3/4\pi)] = [-1, -1, +1, -1]/\sqrt{2}. \quad (5\text{-}2)$$

Since (5-1), (5-2) do not meet $\Delta\theta o = \frac{1}{4}\pi$, if int(k/2) is substituted by k/2+¼ and int((k+1)/2) is substituted by k/2+¾ to meet $\Delta\theta o = \frac{1}{4}\pi$,
the following equations are obtained:

$$\phi = \pi/4 \cdot k, \theta ao = 5/8\pi, \theta bo = 7/8\pi, \Delta\theta o = \frac{1}{4}\pi$$

$$Vn = [+\cos(9/8\pi), -\sin(9/8\pi), +\cos(7/8\pi), -\sin(7/8\pi)] = [-0.9238795, +0.3826834, -0.9238795, -0.3826834]$$

$$Vq = [+\sin(9/8\pi), +\cos(9/8\pi), +\sin(7/8\pi), +\cos(7/8\pi)] = [-0.3826834, -0.9238795, +0.3826834, -0.9238795]. \quad (5)$$

FIG. 3H illustrates a phase pattern in which the burst fields A and B change in phase in the opposite directions and the AB phase difference is 45 degrees ($\Delta\theta o = \frac{1}{4}\pi$) as burst pattern 23.

Since $\theta a = \frac{1}{2}\pi \cdot (\text{int}(k/2)+1)$ and $\theta b = -\frac{1}{2}\pi \cdot (\text{int}((k+1)/2)+1)$, if int(k/2) is substituted by k/2 and int((k+1)/2) is substituted by k/2 as in the fifth example, the following equations are obtained:

$$\phi = \pi/4 \cdot k, \theta ao = \frac{1}{2}\pi, \theta bo = \frac{1}{2}\pi, \Delta\theta o = 0$$

$$Vn = [+\cos(5/4\pi), -\sin(5/4\pi), +\cos(5/4\pi), +\sin(5/4\pi)] = [-1, +1, -1, -1]/\sqrt{2}$$

$$Vq = [+\sin(5/4\pi), +\cos(5/4\pi), +\sin(5/4\pi), -\cos(5/4\pi)] = [-1, -1, -1, +1]/\sqrt{2}. \quad (6\text{-}1)$$

If int(k/2) is substituted by k/2 and int((k+1)/2) is substituted by k/2+1, the following equations are obtained:

$$\phi = \pi/4 \cdot k, \theta ao = \frac{1}{2}\pi, \theta bo = 2/2\pi, \Delta\theta o = \frac{1}{2}\pi$$

$$Vn = [+\cos(5/4\pi), -\sin(5/4\pi), +\cos(3/4\pi), +\sin(3/4\pi)] = [-1, +1, -1, +1]/\sqrt{2}$$

$$Vq = [+\sin(5/4\pi), +\cos(5/4\pi), +\sin(3/4\pi), -\cos(3/4\pi)] = [-1, -1, +1, +1]/\sqrt{2}. \quad (6\text{-}2)$$

If int(k/2) is substituted by k/2+¼ and int((k+1)/2) is substituted by k/2+¾, the following equations are obtained:

$$\phi=\pi/4 \cdot k, \theta ao=\frac{5}{8}\pi, \theta bo=\frac{7}{8}\pi, \Delta\theta o=\frac{1}{4}\pi$$

$$Vn=[+\cos(9/8\pi),-\sin(9/8\pi),+\cos(7/8\pi),+\sin(7/8\pi)]=[-0.9238795,+0.3826834,-0.9238795,+0.3826834]$$

$$Vq=[+\sin(9/8\pi),+\cos(9/8\pi),+\sin(7/8\pi),-\cos(7/8\pi)]=[-0.3826834,-0.9238795,+0.3826834,+0.9238795]. \quad (6)$$

In null demodulation, if initial phases measured at the calibration process are designated as θa and θb, the initial phases θa and θb are used at initial phase correction. Thus, it is necessary to measure parameters for rotation correction separately from parameters for initial phase correction at the calibration process in the null demodulation. In contrast, in NQ conversion, [Vn; Vq]=[sin θa, cos θa, 0, 0; 0, 0, sin θb, cos θb], and initial phase shifts appear in the rotation of NvsQ Lissajous. Thus, in the first to sixth examples, the initial phase shifts can be corrected by rotation correction, which eliminates the need to determine parameters for initial phase correction.

In the first comparative example and the first to sixth examples, the amount of correction operation can be the same at demodulation in the device under operation by multiplying in advance the matrix [Vn; Vq] and the rotation correction matrix.

In the phase-quadrature pattern of FIG. 3B, it is necessary to meet swTP≈MRW/2, whereas in the burst patterns of FIGS. 3G and 3H, it is only necessary to meet swTP≈MRW, which reduces the STW time to about a half of that in the phase-quadrature pattern of the comparative example 2.

In the null-type burst pattern of FIG. 3A and the burst patterns of FIGS. 3C to 3H, it is only necessary to meet swTP≈MRW and thus the STW time is the same. As compared to the null-type burst pattern of FIG. 3A and the burst patterns of FIGS. 3C to 3F, in the burst patterns of FIGS. 3G and 3H, the distance of the magnetization pattern period is doubled and thus the demodulation S/N is relatively deteriorated but the demodulation distance range can be widened.

FIGS. 4A1 to 4A3 are diagrams of demodulated positions, demodulation errors, and sensitivity errors in the burst pattern illustrated in FIG. 3A with no phase shift nor frequency drift, FIGS. 4B1 to 4B3 are diagrams of demodulated positions, demodulation errors, and sensitivity errors in the burst pattern illustrated in FIG. 3B with no phase shift or frequency drift, FIGS. 4C1 to 4C3 are diagrams of demodulated positions, demodulation errors, and sensitivity errors in the burst patterns illustrated in FIGS. 3C to 3F with no phase shift or frequency drift, and FIGS. 4D1 to 4D3 are diagrams of demodulated positions, demodulation errors, and sensitivity errors in the burst patterns illustrated in FIGS. 3G to 3H with no phase shift or frequency drift.

FIGS. 5A1 to 5A3 are diagrams of demodulated positions, demodulation errors, and sensitivity errors in the burst pattern illustrated in FIG. 3A with a phase shift in the B-phase and with no frequency drift, FIGS. 5B1 to 5B3 are diagrams of demodulated positions, demodulation errors, and sensitivity errors in the burst pattern illustrated in FIG. 3G with a phase shift in the B-phase and with no frequency drift, and FIGS. 5C1 to 5C3 are diagrams of demodulated positions, demodulation errors, and sensitivity errors in the burst pattern illustrated in FIG. 3H with a phase shift in the B-phase and with no frequency drift. The phase shift in the B-phase of the burst pattern is set at 0.1π.

Figure 6A:
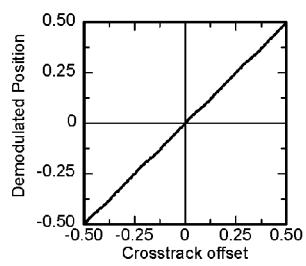
FIGS. 6A to 6C are diagrams of demodulated positions, demodulation errors, and sensitivity errors in the burst pattern illustrated in FIG. 3H with phase shifts in A- and B-phases and with no frequency drift.
Figure 6B:
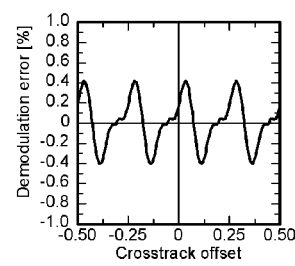
Figure 6C:
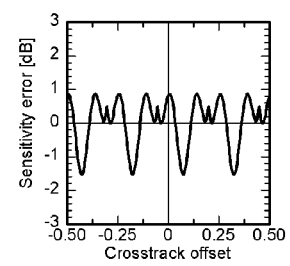

FIGS. 6A to 6C are diagrams of demodulated positions, demodulation errors, and sensitivity errors in the burst pattern illustrated in FIG. 3H with phase shifts in the A- and the B-phases and with no frequency drift. The phase shifts in the A-phase and the B-phase of the burst pattern are set at 0.1π.

FIGS. 7A1 to 7A3 are diagrams of demodulated positions, demodulation errors, and sensitivity errors in the burst pattern illustrated in FIG. 3B with no phase shift and with a frequency drift, FIGS. 7B1 to 7B3 are diagrams of demodulated positions, demodulation errors, and sensitivity errors in the burst patterns illustrated in FIGS. 3D and 3F with no phase shift and with a frequency drift, FIGS. 7C1 to 7C3 are diagrams of demodulated positions, demodulation errors, and sensitivity errors in the burst pattern illustrated in FIG. 3G with no phase shift and with a frequency drift, and FIGS. 7D1 to 7D3 are diagrams of demodulated positions, demodulation errors, and sensitivity errors in the burst pattern illustrated in FIG. 3H with no phase shift and with a frequency drift. The frequency drift in the burst pattern is set at 1.5%.

In the burst pattern of FIG. 3A, the demodulated position, the demodulation error, and the sensitivity error with phase shifts and with no frequency drift in the A-phase and the B-phase, and the demodulated position, the demodulation error, and the sensitivity error with no phase shift and with frequency drifts in the A-phase and the B-phase, are equal to those in FIGS. 4A1 to 4A3.

In the burst pattern of FIG. 3B, the demodulated position, the demodulation error, and the sensitivity error with a phase shift and with no frequency drift in the B-phase, and the demodulated position, the demodulation error, and the sensitivity error with phase shifts and with no frequency drift in the A-phase and the B-phase, are equal to those in FIGS. 4B1 to 4B3.

In the burst pattern of FIG. 3C, the demodulated position, the demodulation error, and the sensitivity error with a phase shift and with no frequency drift in the B-phase, and the demodulated position, the demodulation error, and the sensitivity error with no phase shift and with frequency drifts in the A-phase and the B-phase, are equal to those in FIGS. 4C1 to 4C3.

In the burst pattern of FIG. 3D, the demodulated position, the demodulation error, and the sensitivity error with no phase shift or frequency drift in the A-phase and the B-phase, the demodulated position, the demodulation error, and the sensitivity error with a phase shift and with no frequency drift in the B-phase, and the demodulated position, the demodulation error, and the sensitivity error with phase shifts and with no frequency drift in the A-phase and the B-phase, are equal to those in FIGS. 4C1 to 4C3.

In the burst pattern of FIG. 3E, the demodulated position, the demodulation error, and the sensitivity error with no phase shift or frequency drift in the A-phase and the B-phase, the demodulated position, the demodulation error, and the sensitivity error with a phase shift and with no frequency drift in the B-phase, the demodulated position, the demodulation error, and the sensitivity error with phase shifts and with no frequency drift in the A-phase and the B-phase, and the demodulated position, the demodulation error, and the sensitivity error with no phase shift and with frequency drifts in the A-phase and the B-phase, are equal to those in FIGS. 4C1 to 4C3.

In the burst pattern of FIG. 3F, the demodulated position, the demodulation error, and the sensitivity error with no phase shift or frequency drift in the A-phase and the B-phase, the demodulated position, the demodulation error, and the sensitivity error with a phase shift and with no frequency drift in the B-phase, and the demodulated position, the demodulation error, and the sensitivity error with phase shifts and with no frequency drift in the A-phase and the B-phase are equal to those in FIGS. 4C1 to 4C3, and the demodulated position, the demodulation error, and the sensitivity error with no phase shift and with frequency drifts in the A-phase and the B-phase, are equal to those in FIGS. 7B1 to 7B3.

In the burst pattern of FIG. 3G, the demodulated position, the demodulation error, and the sensitivity error with phase shifts and with no frequency drift in the A-phase and the B-phase, are equal to those in FIGS. 4D1 to 4D3.

In the burst pattern of FIG. 3H, the demodulated position, the demodulation error, and the sensitivity error with no phase shifts or frequency drift in the A-phase and the B-phase, are equal to those in FIGS. 4D1 to 4D3.

In the null-type burst pattern of FIG. 3A, the demodulation linearity deteriorates with respect to a phase shift in one of the bursts, which requires initial phase correction. In the phase-quadrature pattern of FIG. 3B, the demodulation linearity is not favorable. Meanwhile, in the burst patterns of FIGS. 3C to 3F, the same linearity as that in the null-type burst pattern N of FIG. 3A can be obtained under the nominal condition. In the burst patterns of FIGS. 3C to 3F, initial phase shifts appear as NvsQ Lissajous rotation due to phase differences but can be corrected by rotation angle correction.

In the null-type burst pattern of FIG. 3A and the burst patterns of FIGS. 3E and 3F, the phase shifts in both of the bursts can be canceled and thus no NvsQ Lissajous rotation occurs. Meanwhile, in the burst patterns of FIGS. 3C and 3D, the phase shifts cannot be cancelled, and thus NvsQ Lissajous rotation occurs but can be corrected by rotation angle correction.

The null-type burst pattern of FIG. 3A is not influenced by the frequency drift. Meanwhile, in the burst pattern of FIG. 3C, NvsQ Lissajous rotates, but it is possible to prevent the linearity from deteriorating by rotation angle correction. In the burst patterns of FIGS. 3D to 3F, the linearity slightly deteriorates.

The rotation angle correction is made using the calibration process or parameters obtained by timer calibration. Thus, the rotation angle correction is effective only on constant shifts and cannot handle transient phase variations and frequency variations.

As described above, the burst patterns of FIGS. 3C to 3F are effective on constant phase shifts. Meanwhile, the burst patterns of FIGS. 3E to 3F are less effective on frequency drifts.

In the case of different transient phase variations between the burst fields A and B, the effects of the phase variations appear on demodulation in all of the burst patterns including the null-type burst pattern of FIG. 3A. In the case of the same phase variations between the burst fields A and B, the null-type burst pattern of FIG. 3A and the burst patterns of FIGS. 3E and 3F are immune to the phase variations.

In the burst patterns of FIGS. 3G and 3H, the demodulation error and the position sensitivity variation are about twice larger than those in the burst patterns of FIGS. 3C to 3F. Since the position sensitivity variation does not depend on the magnetization pattern period, it can be said that the about twofold position sensitivity variation falls within the allowable range. However, the unit of demodulation error is a magnetization pattern period in the cross-track direction, and thus as comparing the burst patterns by the unit of swTP≈MRW, the demodulation error in the burst patterns of FIGS. 3G and 3H is about four times larger.

In the null-type burst pattern of FIG. 3A and the burst patterns of FIGS. 3C to 3F, NvsQ Lissajous is circular or approximately square, and it is possible to obtain favorable demodulation linearity by applying the foregoing second-order polynomial or third-order polynomial linearity correction functions. In the burst patterns of FIGS. 3G and 3H, NvsQ Lissajous may not be approximately square but approximately octagonal. In such NvsQ Lissajous, it is conceived that the seventh-order component of the DFT result in the cross-track direction D1 is more dominant than the third-order component of the same.

Second Embodiment

Descriptions will be given below as to a method for demodulating NvsQ Lissajous in which the components other than the third-order component of the DFT result in the cross-track direction D1 are significant.

If the STW step count is designated as n with respect to one magnetization pattern period, the third-order component with n−1 appears significantly in the null-type burst pattern of FIG. 3A with n=4 and the burst patterns of FIGS. 3C to 3F. Thus, suited to these patterns is linearity correction using polynomial approximation in which 1/(2n) of one period=⅛, that is, NvsQ Lissajous is divided into eight.

Figure 8:
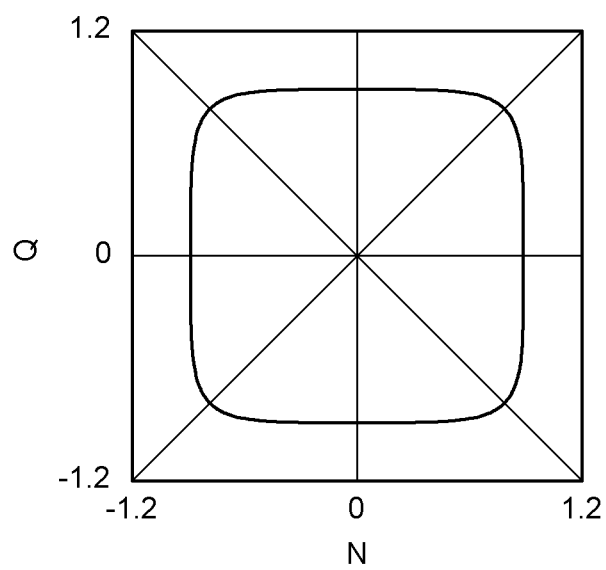
FIG. 8 is a diagram for describing a Lissajous division method with linearity correction according to a second embodiment.

FIG. 8 is a diagram for describing a Lissajous division method with linearity correction according to a second embodiment.

Referring to FIG. 8, when 2n=8 (n=4), NvsQ Lissajous is approximately square. In this case, NvsQ Lissajous is divided into eight such that NvsQ Lissajous has line symmetry at linearity correction using polynomial approximation.

Figure 9:
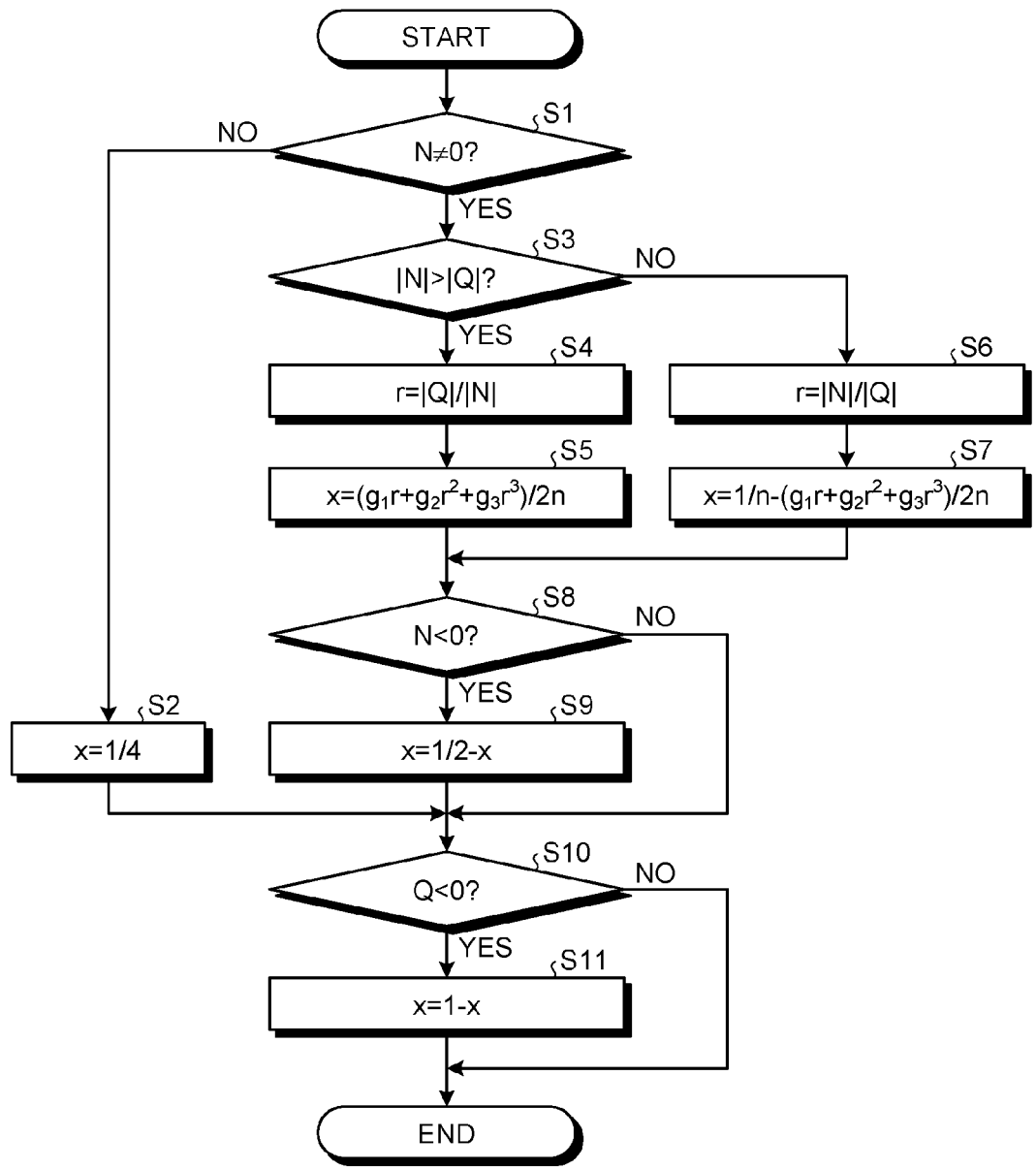
FIG. 9 is a diagram for describing a linearity correction method in a phase pattern according to the second embodiment.

FIG. 9 is a diagram for describing a linearity correction method in a phase pattern according to the second embodiment.

Referring to FIG. 9, it is determined whether N is not 0 (S1), and when N is 0 (S1: NO), x=¼ (S2). In the following description, the position error signal (PES) is designated as x. Next, it is determined whether Q is smaller than 0 (S10), and when Q is smaller than 0 (S10: YES), x=1−x (S11). When Q is equal to or larger than 0, (S10: NO), the process skips S11.

Meanwhile, when N is not 0 (S1: YES), it is determined whether the absolute value of N is larger than the absolute value of Q (S3). When the absolute value of N is larger than the absolute value of Q (S3: YES), r=|Q|/|N|, x=($g_1$×r+$g_2$×$r^2$+$g_3$×$r^3$)/2n (S4 and S5). Next, it is determined whether N is smaller than 0 (S8), and when N is smaller than 0 (S8: YES), x=½−x (S9) and the process moves to S10. When N is equal to or more than 0 (S8: NO), the process skips S9 and moves to S10.

Meanwhile, when the absolute value of N is equal to or more than the absolute value of Q (S3: NO), r=|N|/|Q|, x=1/n−($g_1$×r+$g_2$×$r^2$+$g_3$×$r^3$)/2n (S6, S7), and the process moves to S8.

Third Embodiment

Figure 10:
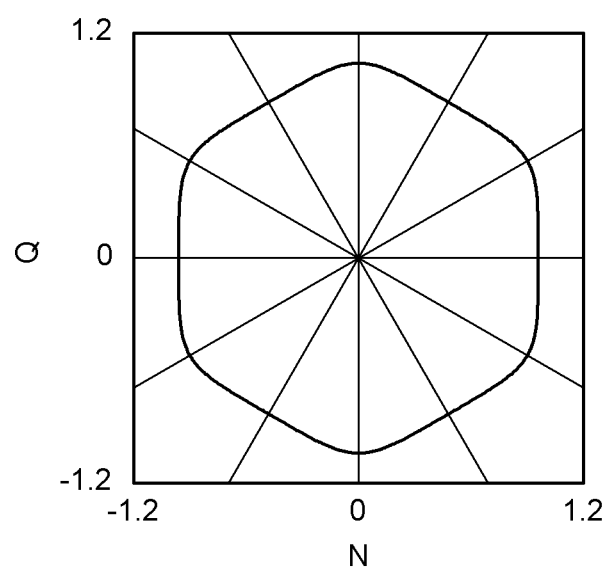
FIG. 10 is a diagram for describing a Lissajous division method with linearity correction according to a third embodiment.

FIG. 10 is a diagram for describing a Lissajous division method with linearity correction according to a third embodiment.

Referring to FIG. 10, when 2n=12 (n=6), NvsQ Lissajous is approximately hexagonal. In this case, NvsQ Lissajous is divided into 12 such that NvsQ Lissajous has line symmetry at linearity correction using polynomial approximation.

Figure 11:
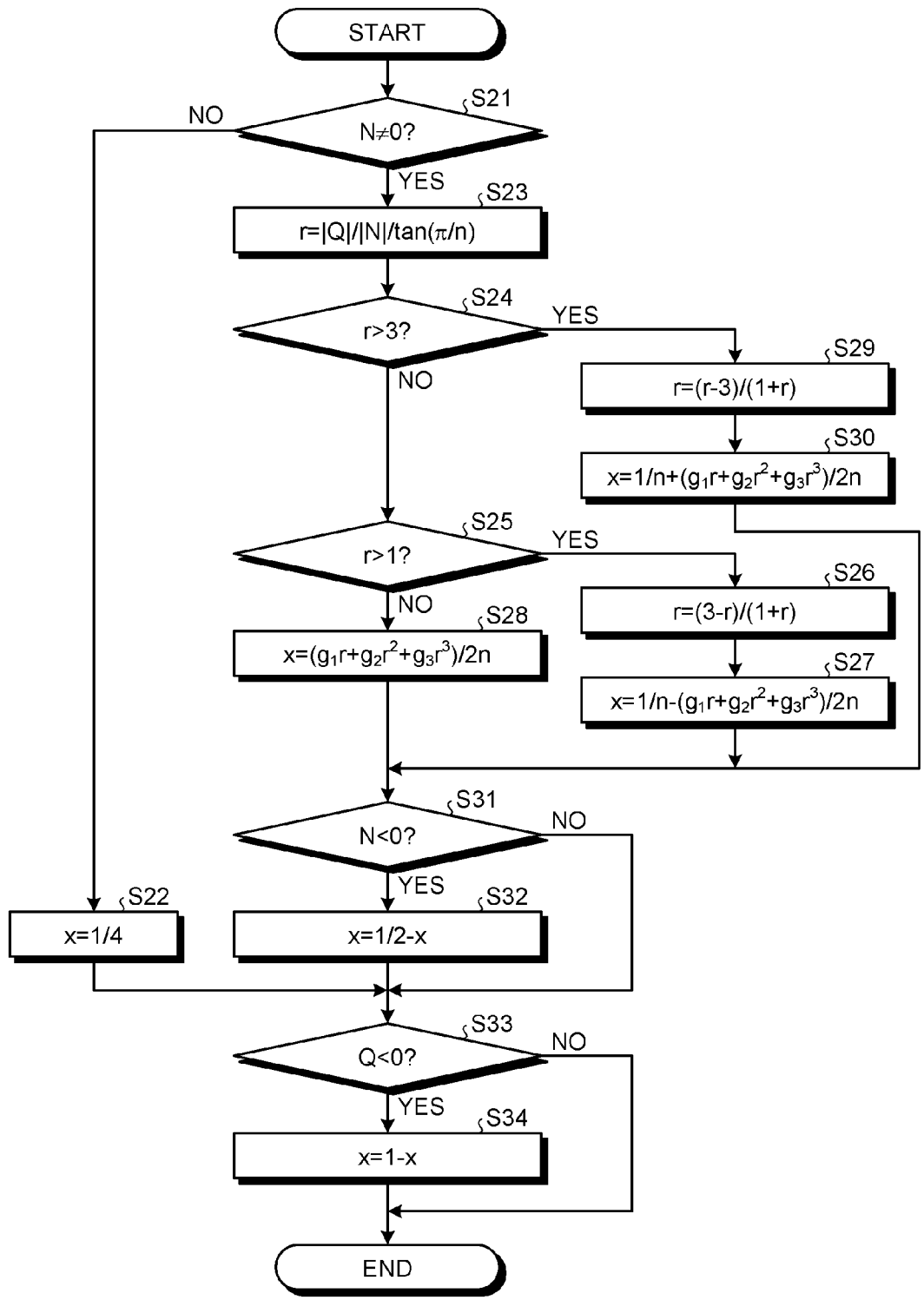
FIG. 11 is a diagram for describing a linearity correction method according to the third embodiment.

FIG. 11 is a diagram for describing a linearity correction method according to the third embodiment.

Referring to FIG. 11, it is determined whether N is not 0 (S21), and when N is 0 (S21: NO), x=¼ (S22). Next, it is determined whether Q is smaller than 0 (S33), and when Q is smaller than 0 (S33: YES), x=1−x (S34). When Q is equal to or larger than 0 (S33: NO), the process skips S34.

Meanwhile, when N is not 0 (S21: YES), r=|Q|/|N|/tan(π/n) (S23). Next, it is determined whether r is larger than 3

(S24), and when r is equal to or smaller than 3 (S24: NO), it is then determined whether r is larger than 1 (S25). When r is larger than 1 (S25: YES), $r=(3-r)/(1+r)$, $x=1/n-(g_1 \times r+g_2 \times r^2+g_3 \times r^3)/2n$ (S26 and S27). Next, it is determined N is smaller than 0 (S31), and when N is smaller than 0 (S31: YES), $x=\frac{1}{2}-x$ (S32), and the process moves to S33. When N is equal to or larger than 0 (S31: NO), the process skips S32 and moves to S33.

Meanwhile, when r is equal to or less than 1 (S25: NO), $x=(g_1 \times r+g_2 \times r^2+g_3 \times r^3)/2n$ (S28), and the process moves to S31.

Meanwhile, when r is larger than 3 (S24: YES), $r=(r-3)/(1+r)$, $x=1/n+(g_1 \times r+g_2 \times r^2+g_3 \times r^3)/2n$ (S29 and S30), and the process moves to S31.

Fourth Embodiment

In the burst patterns illustrated in FIGS. 3G and 3H with n=8, n−1=seventh-order component appears, but since ns=2, n/ns−1=third-order component also appears.

When n−1=seventh-order component is dominant where n=8, suited is linearity correction using polynomial approximation in which 1/(2n) of one period=¹⁄₁₆, that is, NvsQ Lissajous is divided into 16.

The correction function of division number 2n is suitably applied to n−1-order relative amplitude, but can also be applied to 2n−1-order relative amplitude. That is, the eight-divided correction function can also be applied to the seventh-order component.

Figure 12:
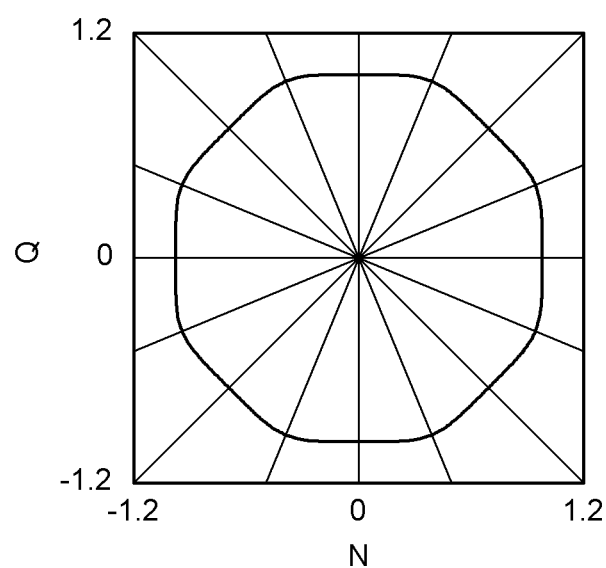
FIG. 12 is a diagram for describing a Lissajous division method with linearity correction according to a fourth embodiment.

FIG. 12 is a diagram for describing a Lissajous division method with linearity correction according to a fourth embodiment.

Referring to FIG. 12, when 2n=16 (n=8), NvsQ Lissajous becomes approximately octagonal. In this case, NvsQ Lissajous is divided to 16 such that NvsQ Lissajous has linear symmetry at linearity correction using polynomial approximation.

Figure 13:
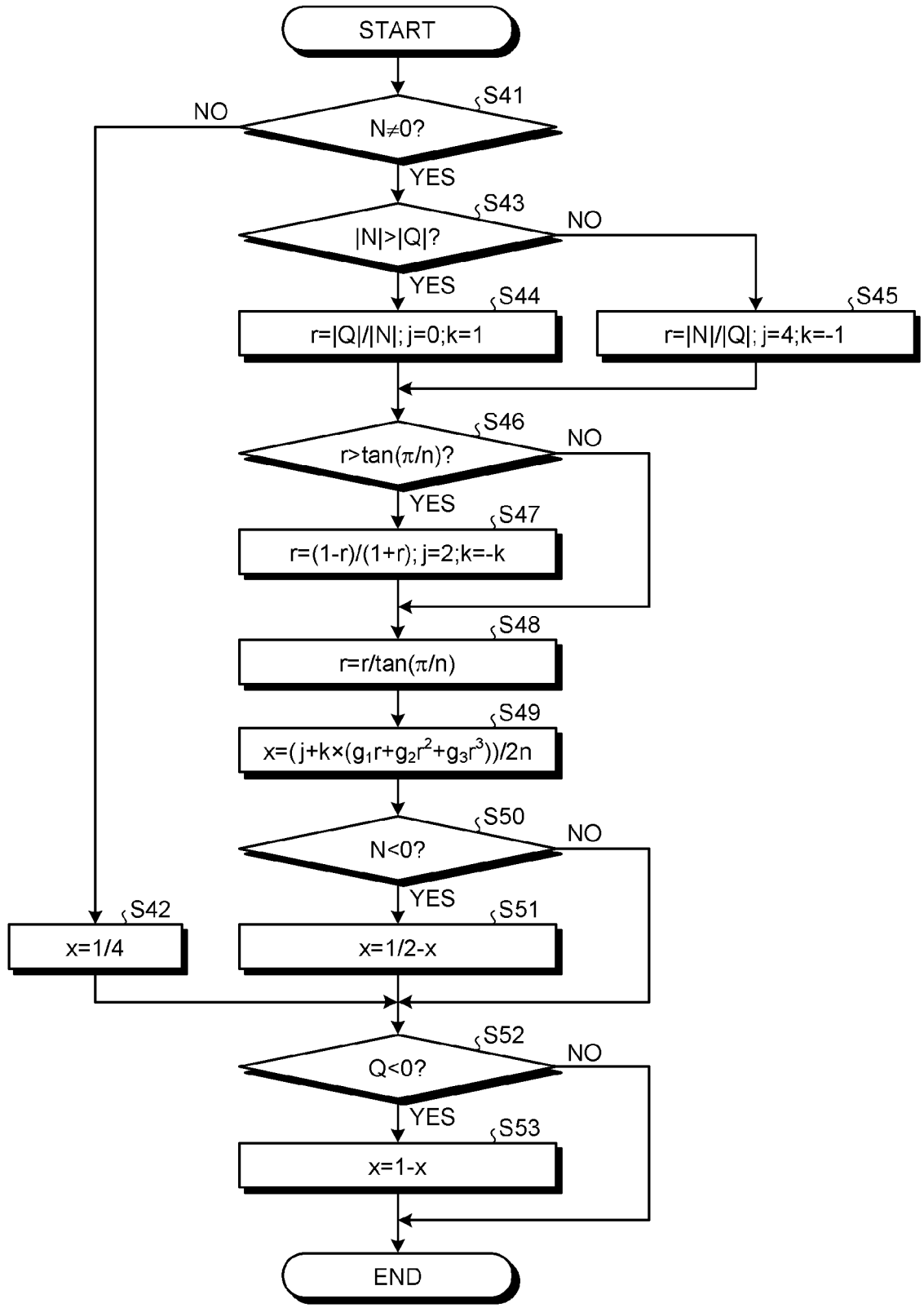
FIG. 13 is a diagram for describing a linearity correction method according to the fourth embodiment.

FIG. 13 is a diagram for describing a linearity correction method according to the fourth embodiment.

Referring to FIG. 13, it is determined whether N is not 0 (S41), and when N is 0 (S41: NO), $x=\frac{1}{4}$ (S42). Next, it is determined whether Q is smaller than 0 (S52), and when Q is smaller than 0 (S52: YES), $x=1-x$ (S53). When Q is equal to or more than 0 (S52: NO), the process skips S53.

Meanwhile, when N is not 0 (S41: YES), it is determined whether the absolute value of N is larger than the absolute value of Q (S43). When the absolute value of N is larger than the absolute value of Q (S43: YES), $r=|Q|/|N|$, $j=0$, $k=1$ (S44). Meanwhile, when the absolute value of N is equal to or smaller than the absolute value of Q (S43: NO), $r=|N|/|Q|$, $j=4$, $k=1$ (S45).

Next, it is determined whether r is larger than $\tan(\pi/n)$ (S46), and when r is larger than $\tan(\pi/n)$ (S46: YES), $r=(1-r)/(1+r)$, $j=2$, $k=-k$ (S47). Meanwhile, when r is equal to or less than $\tan(\pi/n)$ (S46: NO), the process skips S47.

Next, $r=r/\tan(\pi/n)$, $x=(j+k \times (g_1 \times r+g_2 \times r^2+g_3 \times r^3))/2n$ (S48 and S49). Then, it is determined whether N is smaller than 0 (S50), and when N is smaller than 0 (S50: YES), $x=\frac{1}{2}-x$ (S51), and the process moves to S52. When N is equal to or larger than 0 (S50: NO), the process skips S51 and moves to S52.

Fifth Embodiment

Linearity correction coefficients in a correction polynomial in which the correction function with the division number of 2n is applied to m-th order component, vary depending on 2n, m.

Descriptions will be given below as to the linearity correction coefficients $g_1$, $g_2$, and $g_3$ in a second-order polynomial and a third-order polynomial and second-order approximation coefficients in which the linearity correction coefficients $g_1$, $g_2$, and $g_3$ fall within the range of 0 to $1/m^2$ with respect to the combinations of (2n, m).

FIG. 14A is a diagram of linearity correction coefficients in the case of using a second-order polynomial according to a fifth embodiment, and FIG. 14B is a diagram of linearity correction coefficients in the case of using a third-order polynomial according to the fifth embodiment. In the examples of FIGS. 14A and 14B, the case where (2n, m)=(8, 3) is provided. In addition, in the examples of FIGS. 14A and 14B, provided is the linearity correction coefficient with which the root-mean-square of one period of demodulation error becomes a minimum. Alternatively, the linearity correction coefficient with which the maximum value of one period of demodulation error becomes minimum may be used, or the linearity correction coefficient with which the maximum value of one period of absolute value of position sensitivity becomes minimum may be used, or the linearity correction coefficient with which the root-mean-square of one period of absolute value of position sensitivity becomes minimum may be used.

The linearity correction coefficient with (2n, m)=(12, 5) is suited to the phase pattern with an AB phase difference of 60°, but cannot be applied to the phase-quadrature pattern. When (2n, m)=(8, 7), the linearity correction coefficient in a second-order polynomial is almost constant with respect to the relative amplitude of the seventh-order component and has almost the same characteristics as those of a tan demodulation, and thus no significant effect of reducing demodulation error can be expected. Accordingly, when (2n, m)=(8, 7), it is preferred to apply a third-order polynomial as a linear correction function.

Sixth Embodiment

As illustrated in FIGS. 14A and 14B, the linearity correction coefficients vary according to $a_3/a_1$, where $a_3$ denotes third-order amplitude and $a_1$ denotes first-order amplitude. Thus, if the linearity correction coefficients are to be stored according to $a_3/a_1$, an enormous storage capacity is required. Accordingly, to reduce a storage capacity, the linearity correction coefficients may be approximated by a second-order approximate equation such that second-order approximation coefficients may be held.

FIG. 15 is a diagram of second-order approximation coefficients of linearity correction coefficients with which the maximum value of one period of demodulation error is minimum according to a sixth embodiment, FIG. 16 is a diagram of second-order approximation coefficients of linearity correction coefficients with which the root-mean-square value of one period of demodulation error is minimum according to the sixth embodiment, FIG. 17 is a diagram of second-order approximation coefficients of linearity correction coefficients with which the maximum value of one period of absolute value of position sensitivity is minimum according to the sixth embodiment, and FIG. 18 is a diagram of second-order approximation coefficients of linearity correction coefficients with which the root-mean-square value of one period of absolute value of position sensitivity is minimum according to the sixth embodiment.

Referring to FIGS. 15 to 18, when (2n, m)=(12, 5), (16, 7) or (8, 7), the linearity correction coefficients $g_2$ and $g_3$ are expressed by the function of $a_m/a_1$ using second-order approximation coefficients $C_{20}$, $C_{21}$, and $C_{22}$, which eliminates the need to store the linearity correction coefficients according to $a_m/a_1$ to reduce a storage capacity.

Seventh Embodiment

Figure 19:
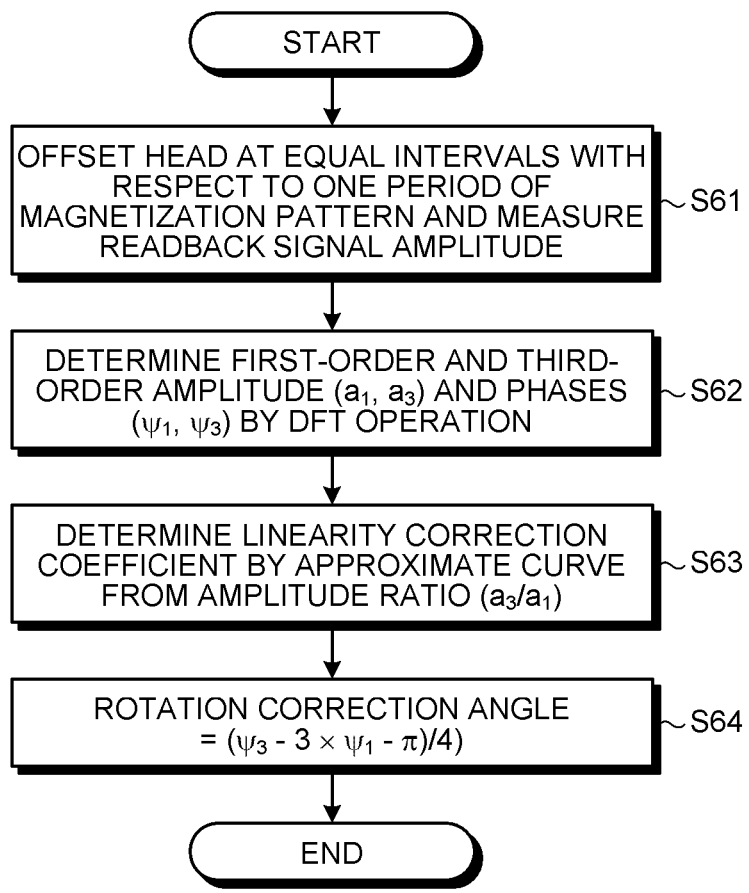
FIG. 19 is a diagram for describing a method for calculating a linearity correction coefficient and a rotation correction angle according to a seventh embodiment.

FIG. 19 is a diagram for describing a method for calculating a linearity correction coefficient and a rotation correction angle according to a seventh embodiment. The method of FIG. 19 is applied to phase demodulation in a phase pattern.

Referring to FIG. 19, the magnetic head HM is offset at equal intervals in the cross-track direction with respect to one period of magnetization pattern, and readback signal amplitude is measured (S61). Next, the value of the amplitude obtained by offsetting of the magnetic head HM or the ratio of change of the amplitude value to each offsetting is subjected to a DFT operation with respect to the servo pattern period, thereby to determine first-order and third-order amplitudes $(a_1, a_3)$ and phases $(\phi_1, \phi_3)$ (S62). Next, the linearity correction coefficient is determined by an approximate curve from the amplitude ratio $a_3/a_1$ (S63). Then, the rotation correction angle of NvsQ Lissajous=$(\phi_3-3\times\phi_1-\pi)/4$ (S64).

Eighth Embodiment

Figure 20:
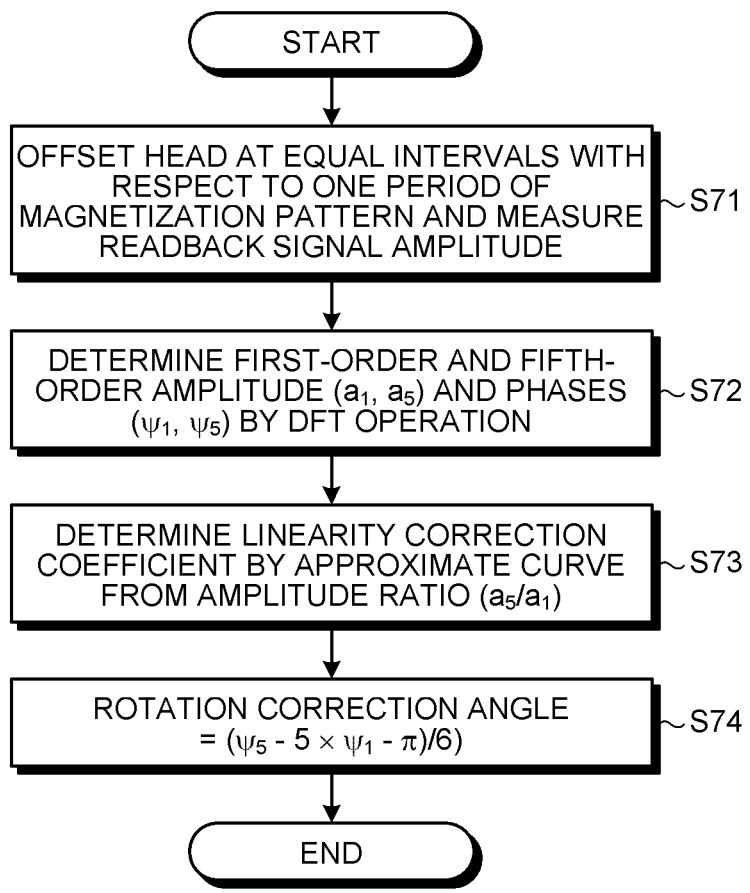
FIG. 20 is a diagram for describing a method for calculating a linearity correction coefficient and a rotation correction angle according to an eighth embodiment.

FIG. 20 is a diagram for describing a method for calculating a linearity correction coefficient and a rotation correction angle according to an eighth embodiment.

Referring to FIG. 20, the read head HR is offset at equal intervals in the cross-track direction with respect to one period of magnetization pattern, and the readback signal amplitude is measured (S71). Next, the value of the amplitude obtained by offsetting of the read head HR or the ratio of change of the amplitude value to each offsetting is subjected to a DFT operation with respect to the servo pattern period, thereby to determine first-order and fifth-order amplitudes $(a_1, a_5)$ and phases $(\phi_1, \phi_5)$ (S72). Next, the linearity correction coefficient is determined by an approximate curve from the amplitude ratio $a_5/a_1$ (S73). Then, the rotation correction angle of NvsQ Lissajous=$(\phi_5-5\times\phi_1-\pi)/6$ (S74).

Ninth Embodiment

Figure 21:
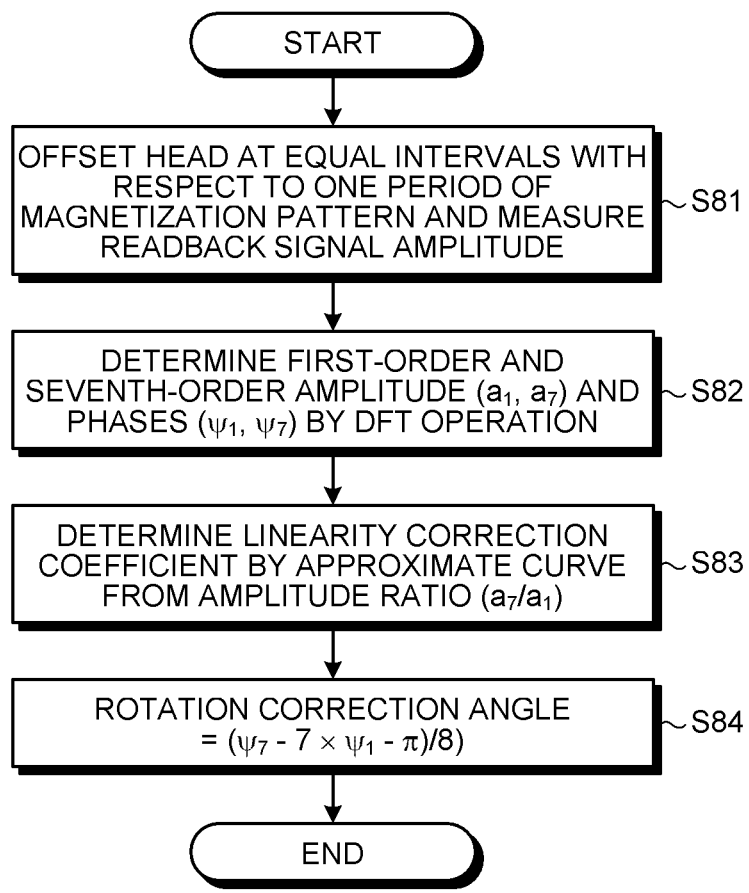
FIG. 21 is a diagram for describing a method for calculating a linearity correction coefficient and a rotation correction angle according to a ninth embodiment.

FIG. 21 is a diagram for describing a method for calculating a linearity correction coefficient and a rotation correction angle according to a ninth embodiment.

Referring to FIG. 21, the read head HR is offset at equal intervals in the cross-track direction with respect to one period of magnetization pattern, and the readback signal amplitude is measured (S81). Next, the value of the amplitude obtained by offsetting of the read head HR or the ratio of change of the amplitude value to each offsetting is subjected to a DFT operation with respect to the servo pattern period, thereby to determine first-order and seventh-order amplitudes $(a_1, a_7)$ and phases $(\phi_1, \phi_7)$ (S82). Next, the linearity correction coefficient is determined by an approximate curve from the amplitude ratio $a_7/a_1$ (S83). Then, the rotation correction angle of NvsQ Lissajous=$(\phi_7-7\times\phi_1-\pi)/8$ (S84).

Tenth Embodiment

In the burst patterns illustrated in FIGS. 3G and 3H, n=8 but the seventh-order component is significant and thus an approximately octagonal Lissajous appears in some cases, and the third-order component is significant and thus an approximately square Lissajous appears in the other cases. Accordingly, it is preferred to select linearity correction with (2n, m)=(8, 3) or linearity correction with (2n, m)=(16, 7) or (8, 7) according to the magnitude relation between the third-order component $a_3$ and the seventh-order component $a_7$.

Figure 22:
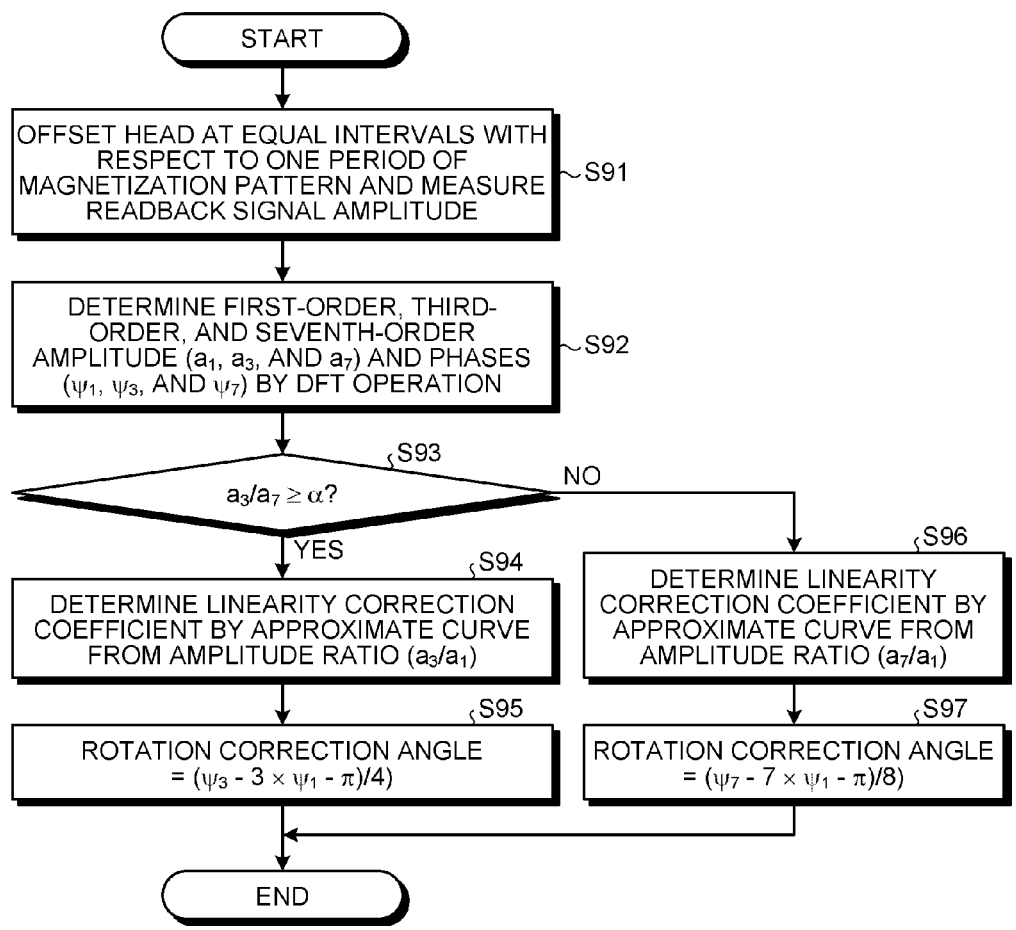
FIG. 22 is a diagram for describing a method for calculating a linearity correction coefficient and a rotation correction angle according to a tenth embodiment.

FIG. 22 is a diagram for describing a method for calculating a linearity correction coefficient and a rotation correction angle according to a tenth embodiment.

Referring to FIG. 22, the read head HR is offset at equal intervals in the cross-track direction with respect to one period of magnetization pattern, and the readback signal amplitude is measured (S91). Next, the value of the amplitude obtained by offsetting of the read head HR or the ratio of change of the amplitude value to each offsetting is subjected to a DFT operation with respect to the servo pattern period, thereby to determine first-order, third-order, and seventh-order amplitudes $(a_1, a_3, a_7)$ and phases $(\phi_1, \phi_3, \phi_7)$ (S92). It is determined whether the amplitude ratio $a_3/a_7$ is equal to or larger than a predetermined value $\alpha$ (S93), and when the amplitude ratio $a_3/a_7$ is equal to or larger than the predetermined value $\alpha$ (S93: YES), the linearity correction coefficient is determined by an approximate curve from the amplitude ratio $a_3/a_1$ (S94). Next, the rotation correction angle of NvsQ Lissajous=$(\phi_3-3\times\phi_1-\pi)/4$ (S95). Meanwhile, if the amplitude ratio $a_3/a_7$ is not larger than the predetermined value $\alpha$ (S93: NO), the linearity correction coefficient is determined by an approximate curve from the amplitude ratio $a_7/a_1$ (S96). Next, the rotation correction angle of NvsQ Lissajous=$(\phi_7-7\times\phi_1-\pi)/8$ (S97).

Next, a guide for determining the predetermined value $\alpha$ will be provided. The demodulation error and position sensitivity variation resulting from the demodulation of biphase signals N and Q consisting of first-order, third-order, and seventh-order components with (2n, m)=(8, 3) and (16, 7) will be described below.

Figure 23A:
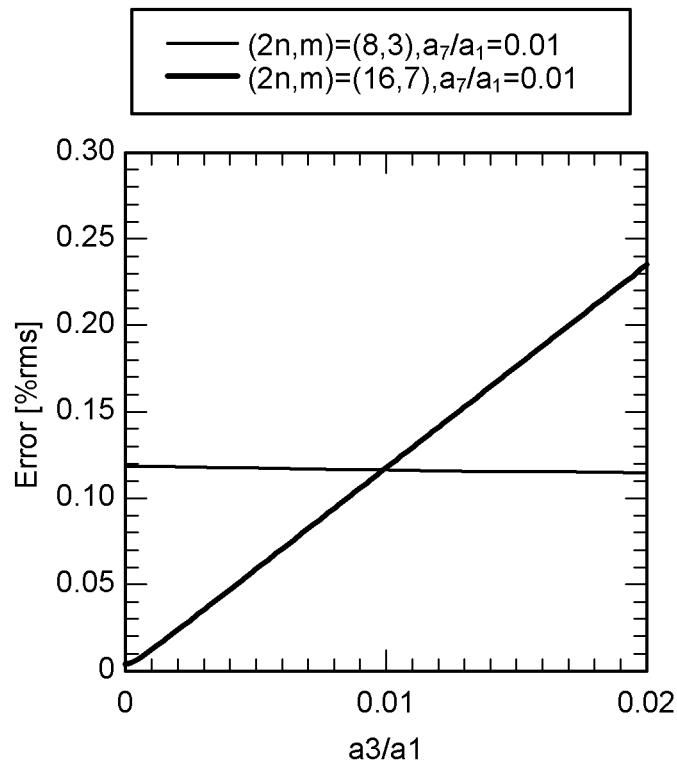
FIG. 23A is a diagram for describing relationship between amplitude ratio of a first-order component to a third-order component and a demodulation error in a linearity correction function according to the tenth embodiment.
Figure 23B:
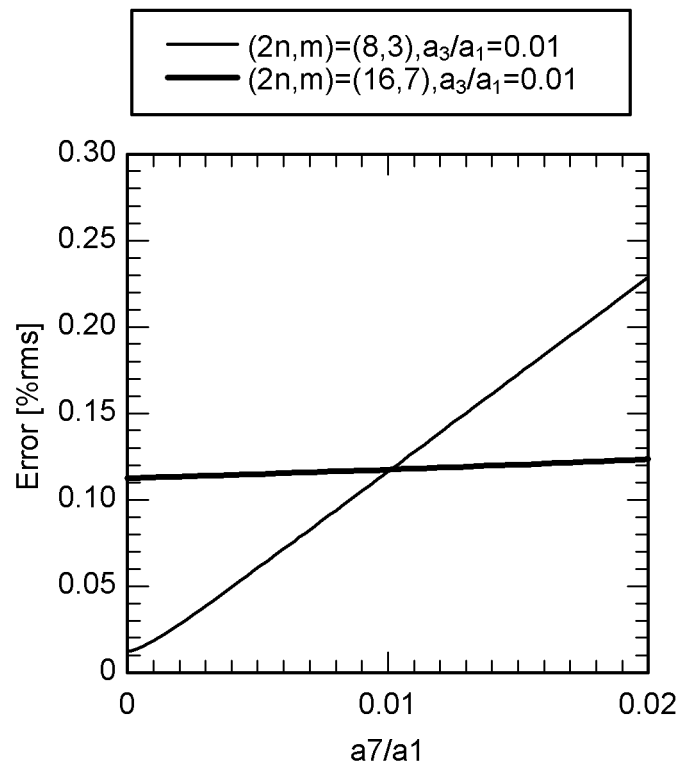
FIG. 23B is a diagram for describing relationship between amplitude ratio of the first-order component to a seventh-order component and the demodulation error in the linearity correction function according to the tenth embodiment.
Figure 24A:
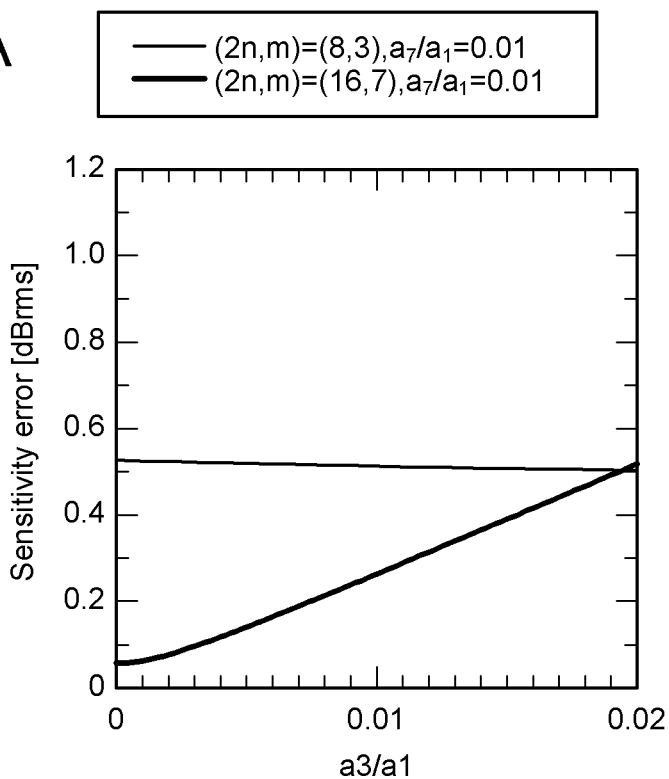
FIG. 24A is a diagram for describing relationship between the amplitude ratio of the first-order component to the third-order component and a position sensitivity in the linearity correction function according to the tenth embodiment.
Figure 24B:
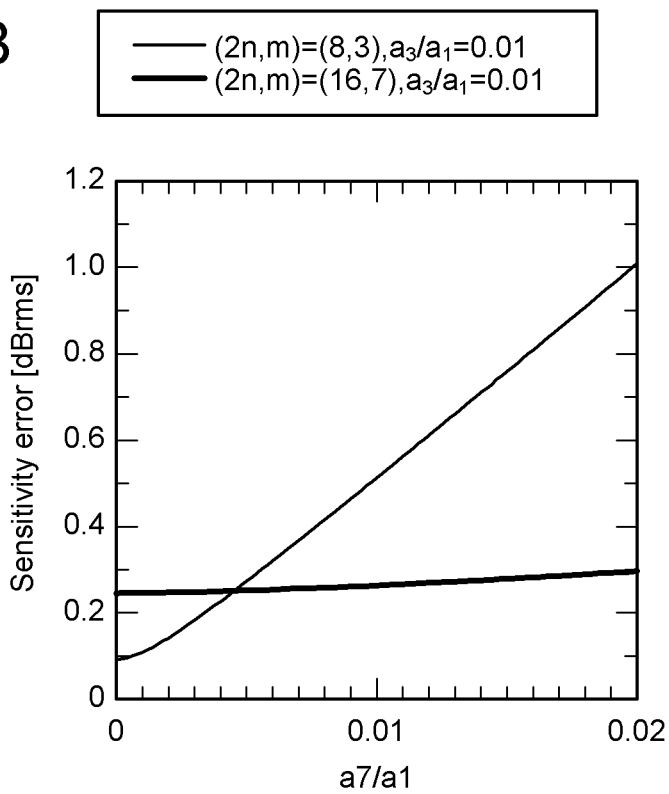
FIG. 24B is a diagram for describing relationship between the amplitude ratio of the first-order component to the seventh-order component and the position sensitivity in the linearity correction function according to the tenth embodiment.

FIG. 23A is a diagram for describing the relationship between the amplitude ratio of a first-order component to a third-order component and a demodulation error in a linearity correction function according to the tenth embodiment, FIG. 23B is a diagram for describing the relationship between the amplitude ratio of the first-order component to a seventh-order component and a demodulation error in the linearity correction function according to the tenth embodiment, FIG. 24A is a diagram for describing the relationship between the amplitude ratio of the first-order component to the third-order component and a position sensitivity in the linearity correction function according to the tenth embodiment, and FIG. 24B is a diagram for describing the relationship between the amplitude ratio of the first-order component to the seventh-order component and a position sensitivity in the linearity correction function according to the tenth embodiment.

FIGS. 23A and 24A illustrate changes in error with respect to $a_3/a_1$ in which $a_7/a_1$ is set at a fixed value (=0.01), and FIGS. 23B and 24B illustrate changes in error with respect to $a_7/a_1$ in which $a_3/a_1$ is set at a fixed value (=0.01).

Figure 25:
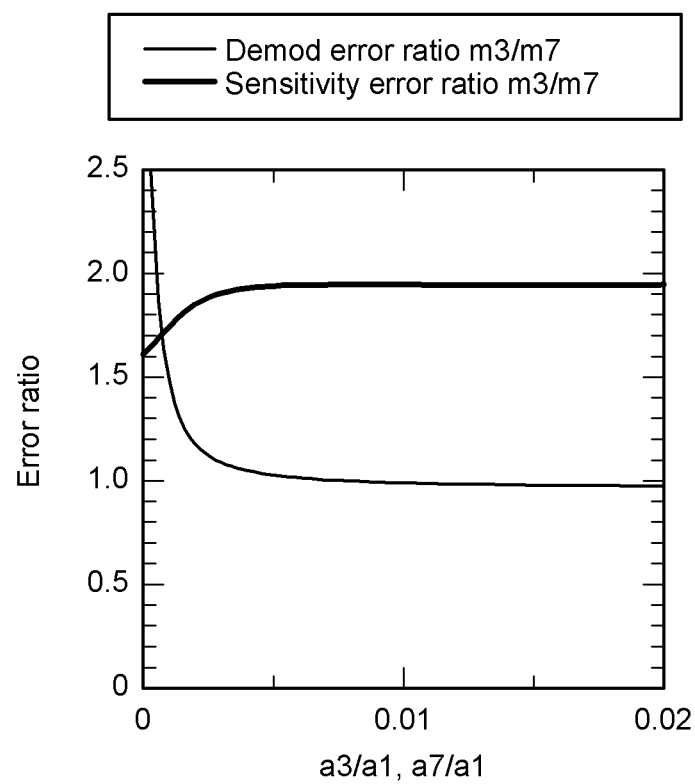
FIG. 25 is a diagram for describing relationship between the amplitude ratio of the first-order component to the third-order component or the amplitude ratio of the first-order component to the seventh-order component and error ratio according to the tenth embodiment.

FIG. 25 is a diagram for describing the relationship between the amplitude ratio of the first-order component to the third-order component or the amplitude ratio of the first-order component to the seventh-order component and the error ratio according to the tenth embodiment.

Referring to FIG. 25, since the demodulation error of (2n, m) is almost constant with changes in $a_m/a_1$, the ratio is obtained by dividing (2n, m)=(8, 3) with changes in $a_7/a_1$ by (2n, m)=(12, 7) with changes in $a_3/a_1$. The error is originally small within the range in which $a_3/a_1$ or $a_7/a_1$ is small, and thus the ratio of demodulation errors is almost 1 and the ratio of position sensitivity variations is about 1.95 within the range in which $a_3/a_1$ is 0.01 or more. Since the position sensitivity is equivalent to the differentiation of the demodulated position, it is considered that the influence of the seventh-order component is larger than that of the third-order component. If the demodulation error is somewhat small, it is considered that the position sensitivity variation has larger influence on device performance, and thus it is desired to set $\alpha=1.95$.

The following are results of demodulation in which the linearity correction functions $2n=8$ and $2n=16$ are applied to the burst patterns of FIGS. 3G and 3H.

FIGS. 26A1 to 26A3 are diagrams of demodulated positions, demodulation errors, and sensitivity errors in a case of executing a linearity correction using a second-order polynomial in the burst pattern illustrated in FIG. 3G with no phase shift nor frequency drift, FIGS. 26B1 to 26B3 are diagrams of demodulated positions, demodulation errors, and sensitivity errors in a case of executing a linearity correction using a second-order polynomial in the burst pattern illustrated in FIG. 3G with a phase shift in B-phase and with no frequency drift, FIGS. 26C1 to 26C3 are diagrams of demodulated positions, demodulation errors, and sensitivity errors in a case of executing a linearity correction using a second-order polynomial in the burst pattern illustrated in FIG. 3G with phase shifts in A- and B-phases and with no frequency drift, and FIGS. 26D1 to 26D3 are diagrams of demodulated positions, demodulation errors, and sensitivity errors in a case of executing a linearity correction using a second-order polynomial in the burst pattern illustrated in FIG. 3G with no phase shift and with a frequency drift.

Applied to the examples illustrated in FIGS. 26A1 to 26A3, FIG. 26B1 to 26B3, FIGS. 26C1 to 26C3, and FIGS. 26D1 to 26D3 are the linearity correction coefficient with which the root-mean-square of one period of the demodulation error with $(2n, m)=(16, 7)$ becomes minimum. In this case, it is possible to obtain more favorable linearity as compared to the case of applying the linearity correction coefficient with which the root-mean-square of one period of the demodulation error becomes minimum with $(2n, m)=(8, 3)$ or $(8, 7)$.

FIGS. 27A1 to 27A3 are diagrams of demodulated positions, demodulation errors, and sensitivity error in a case of executing a linearity correction using a third-order polynomial in the burst pattern illustrated in FIG. 3G with no phase shift nor frequency drift, FIGS. 27B1 to 27B3 are diagrams of demodulated positions, demodulation errors, and sensitivity errors in a case of executing a linearity correction using a third-order polynomial in the burst pattern illustrated in FIG. 3G with a phase shift in B-phase and with no frequency drift, FIGS. 27C1 to 27C3 are diagrams of demodulated positions, demodulation errors, and sensitivity errors in a case of executing a linearity correction using a third-order polynomial in the burst pattern illustrated in FIG. 3G with phase shifts in A- and B-phases and with no frequency drift, and FIGS. 27D1 to 27D3 are diagrams of demodulated positions, demodulation errors, and sensitivity errors in a case of executing a linearity correction using a third-order polynomial in the burst pattern illustrated in FIG. 3G with no phase shift and with a frequency drift.

Applied to the examples illustrated in FIGS. 27A1 to 27A3, FIGS. 27B1 to 27B3, FIG. 27C1 to 27C3, and FIGS. 27D1 to 27D3 are the linearity correction coefficient with which root-mean-square of one period of the demodulation error becomes minimum with $(2n, m)=(16, 7)$. In this case, it is possible to obtain more favorable linearity as compared to the case of applying the linearity correction coefficient with which the root-mean-square of one period of the demodulation error becomes minimum with $(2n, m)=(8, 3)$ or $(8, 7)$.

FIGS. 28A1 to 28A3 are diagrams of demodulated positions, demodulation errors, and sensitivity errors in a case of executing a linearity correction using a second-order polynomial in the burst pattern illustrated in FIG. 3H with no phase shift nor frequency drift, FIGS. 28B1 to 28B3 are diagrams of demodulated positions, demodulation errors, and sensitivity errors in a case of executing a linearity correction using a second-order polynomial in the burst pattern illustrated in FIG. 3H with a phase shift in B-phase and with no frequency drift, FIGS. 28C1 to 28C3 are diagrams of demodulated positions, demodulation errors, and sensitivity errors in a case of executing a linearity correction using a second-order polynomial in the burst pattern illustrated in FIG. 3H with phase shifts in A- and B-phases and with no frequency drift, and FIGS. 28D1 to 28D3 are diagrams of demodulated positions, demodulation errors, and sensitivity errors in a case of executing a linearity correction using a second-order polynomial in the burst pattern illustrated in FIG. 3H with no phase shift and with a frequency drift.

Applied to the examples illustrated in FIGS. 28A1 to 28A3 and FIGS. 28B1 to 28B3 is the linearity correction coefficient with which the root-mean-square of one period of the demodulation error becomes minimum with $(2n, m)=(16, 7)$. In this case, it is possible to obtain more favorable linearity as compared to the case of applying the linearity correction coefficient with which the root-mean-square of one period of the demodulation error becomes minimum with $(2n, m)=(8, 3)$ or $(8, 7)$. Applied to the examples illustrated in FIGS. 28C1 to 28C3 and FIGS. 28D1 to 28D3 is the linearity correction coefficient with which the root-mean-square of one period of the demodulation error becomes minimum with $(2n, m)=(8, 3)$. In this case, it is possible to obtain more favorable linearity as compared to the case of applying the linearity correction coefficient with which the root-mean-square of one period of the demodulation error becomes minimum with $(2n, m)=(8, 7)$ or $(16, 7)$.

FIGS. 29A1 to 29A3 are diagrams of demodulated positions, demodulation errors, and sensitivity errors in a case of executing a linearity correction using a third-order polynomial in the burst pattern illustrated in FIG. 3H with no phase shift nor frequency drift, FIGS. 29B1 to 29B3 are diagrams of demodulated positions, demodulation errors, and sensitivity errors in a case of executing a linearity correction using a third-order polynomial in the burst pattern illustrated in FIG. 3H with a phase shift in B-phase and with no frequency drift, FIGS. 29C1 to 29C3 are diagrams of demodulated positions, demodulation errors, and sensitivity errors in a case of executing a linearity correction using a third-order polynomial in the burst pattern illustrated in FIG. 3H with phase shifts in A- and B-phases and with no frequency drift, and FIGS. 29D1 to 29D3 are diagrams of demodulated positions, demodulation errors, and sensitivity errors in a case of executing a linearity correction using a third-order polynomial in the burst pattern illustrated in FIG. 3H with no phase shift and with a frequency drift.

Applied to the examples illustrated in FIGS. 29A1 to 29A3 and FIGS. 29B1 to 29B3 is the linearity correction coefficient with which the root-mean-square of one period of the demodulation error becomes minimum with $(2n, m)=(16, 7)$. In this case, it is possible to obtain more favorable linearity as compared to the case of applying the linearity correction coefficient with which the root-mean-square of one period of the demodulation error becomes minimum with $(2n, m)=(8, 3)$ or $(8, 7)$. Applied to the examples illustrated in FIGS. 29C1 to 29C3 and FIGS. 29D1 to 29D3 is the linearity correction coefficient with which the root-mean-square of one period of the demodulation error becomes minimum with $(2n, m)=(8, 3)$. In this case, it is possible to obtain more favorable linearity as compared to the case of applying the linearity correction coefficient with which the root-mean-square of one period of the demodulation error becomes minimum with (2n, m)=(8, 7) or (16, 7).

With (2n, m)=(8, 7), when applying the linearity correction coefficient with which the root-mean-square of one period of the demodulation error becomes minimum, the position sensitivity appears at a position close to zero (−∞dB). Thus, the linearity correction coefficient with which the maximum value of one period of the absolute value of the position sensitivity becomes a minimum may be used. In this case, although the demodulation error becomes large slightly, it is possible to suppress position sensitivity variation range.

In the burst pattern of the fifth example illustrated in FIG. 3G, $a_3/a_7$=1.85<1.95 even with a phase shift in the B-phase and with no frequency drift, and thus (2n, m)=(16, 7) is selected under all of the conditions.

Meanwhile, in the burst pattern of the sixth example illustrated in FIG. 3H, it is preferred to select (2n, m)=(12, 7) with no phase shift or frequency drift or with a phase shift in the B-phase and with no frequency drift, and it is preferred to select (2n, m)=(8, 3) with phase shifts in the A-phase and the B-phase and with no frequency drift or with no phase shift and with frequency drifts in the A-phase and the B-phase. In this case, since it is necessary to prepare two demodulation processes with 2n=8 and 2n=16, it is also effective to select (2n, m)=(8, 7) although the demodulation error is larger as compared to the case of selecting (2n, m)=(16, 7) if the seventh-order component is large. When (2n, m)=(8, 7), a second-order polynomial causes a large demodulation error, and thus a third-order polynomial is preferably applied. Alternatively, it is possible to use a weighted mean of linearity correction coefficients with the amplitudes of the third-order component and the seventh-order component.

As described above, in the burst patterns of FIGS. 3C to 3H, the second-order polynomial equation $PES=g_1 \times r + g_2 \times r^2$, $g_1+g_2=1$ or the third-order polynomial $PES=g_1 \times r + g_2 \times r^2 + g_3 \times r^3$ is applied. Alternatively, $PES=g_1 \times N/(|N|+|Q|) + g_2 \times N|N|/(N^2+Q^2)$ may be applied.

Since the burst patterns of FIGS. 3C and 3D have the same phase variation in the same direction, even when the two burst fields in the same pattern are joined into one, it is possible to obtain almost the same demodulation accuracy as that in the burst patterns of FIGS. 3C and 3D. In the case of one burst field, it is possible to eliminate a gap between burst fields and thus improve format efficiency.

Eleventh Embodiment

FIG. 30A is a diagram of a polarity arrangement in a burst pattern according to an eleventh embodiment, FIGS. 30B1 to 30B3 are diagrams of demodulated positions, demodulation errors, and sensitivity errors in a case of executing a linearity correction using a second-order polynomial in the burst pattern illustrated in FIG. 30A with no frequency drift, and FIGS. 30C1 to 30C3 are diagrams of demodulated positions, demodulation errors, and sensitivity errors in a case of executing a linearity correction using a second-order polynomial in the burst pattern illustrated in FIG. 30A with a frequency drift. The frequency drift in the burst pattern is set at 1.5%. In the burst pattern of FIG. 30A, n=6, Δφ=60°.

As illustrated in FIGS. 30B1 to 30B3 and FIGS. 30C1 to 30C3, the demodulation of the burst pattern of FIG. 30A with application of the second-order polynomial with (2n, m)=(12, 5) makes it possible to obtain a more favorable demodulation result as compared to the case of a tan demodulation.

Twelfth Embodiment

FIG. 31A is a diagram of a polarity arrangement in a burst pattern according to a twelfth embodiment, FIGS. 31B1 to 31B3 are diagrams of demodulated positions, demodulation errors, and sensitivity errors in a case of executing a linearity correction using a second-order polynomial in the burst pattern illustrated in FIG. 31A with no frequency drift, and FIGS. 31C1 to 31C3 are diagrams of demodulated positions, demodulation errors, and sensitivity errors in a case of executing a linearity correction using a second-order polynomial in the burst pattern illustrated in FIG. 30A with a frequency drift. The frequency drift in the burst pattern is set at 1.5%. In the burst pattern of FIG. 31A, n=8, Δφ=45°.

As illustrated in FIGS. 31B1 to 31B3 and FIGS. 31C1 to 31C3, the demodulation of the burst pattern of FIG. 31A with application of the second-order polynomial with (2n, m)=(16, 7) makes it possible to obtain a more favorable demodulation result as compared to the case of a tan demodulation.

By making linearity correction to the burst patterns of FIGS. 30A and 31A using the second-order polynomial, it is possible to improve the demodulation linearity. Accordingly, it is possible to widen the STW pitch and shorten the STW time, thereby resulting in improvement of productivity.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A head position demodulation method comprising:
at demodulation of an A-phase burst pattern and a B-phase burst pattern arranged in a down-track direction so as to be different in phase in a cross-track direction, calculating a demodulated position of a magnetic head based on a sin component and a cos component of the A-phase burst pattern and a sin component and a cost component of the B-phase burst pattern,
wherein, assuming that phase differences in the A-phase burst pattern and the B-phase burst pattern in the down-track direction are designated as Δφa and Δφb, respectively, when absolute values of Δφa and Δφb are equal, a cos component of a readback signal in the A-phase burst pattern is designated as cA and a sin component of the same as sA, a cos component of a readback signal in the B-phase burst pattern is designated as cB and a sin component of the same as sB, and sgn=+1 if Δφa/Δφb≥0 and −1 if Δφa/Δφb<0, the demodulated position of the magnetic head is calculated using coefficients ca, sa, cb, and sb based on N and Q calculated as:

$N = cA \cdot ca - sA \cdot sa + cB \cdot cb - sB \cdot sb \cdot sgn$ $Q = cA \cdot sa + sA \cdot ca + cB \cdot sb + sB \cdot cb \cdot sgn.$ 2. The head position demodulation method according to claim 1, wherein, assuming that the phase difference in the B-phase burst pattern in the cross-track direction is designated as Δθo with respect to the A-phase burst pattern, the coefficients ca, sa, cb, and sb at an arbitrary angle θabt are given as:

$ca = \cos(\theta abt + \Delta\theta o/2), sa = \sin(\theta abt + \Delta\theta o/2)$ $cb = \cos(\theta abt - \Delta\theta o/2), sb = \sin(\theta abt - \Delta\theta o/2).$ 3. The head position demodulation method according to claim 1, wherein the absolute values of the phase differences Δφa and Δφb meet the relationship 0<|Δφa|=|Δφb|≤90°.

4. The head position demodulation method according to claim 1, wherein, assuming that when |N|>|Q|, r=|Q|/|N| or when |N|≤|Q|, r=|N|/|Q|, a position error signal of the magnetic head is calculated based on a polynomial "Σ(gi×ri), i=1, 2, . . . " with two or more coefficients gi meeting "Σgi=1, i=1, 2, . . . ".

5. The head position demodulation method according to claim 1, wherein, assuming that division number n of one period of magnetization pattern in the cross-track direction has six or more servo patterns and when |N|>|Q|, r=|Q|/|N|/tan(π/n) or when |N|≤|Q|, r=|N|/|Q|/tan(π/n), a position error signal of the magnetic head is calculated based on a polynomial "Σ(gi×ri), i=1, 2, . . . " with two or more coefficients gi meeting "Σgi=1, i=1, 2, . . . ".

6. The head position demodulation method according to claim 5, wherein
the value of amplitude obtained by offsetting the magnetic head to a plurality of positions in the cross-track direction or the ratio of change of the amplitude value to each offsetting is subjected to a DFT operation with respect to the servo pattern period,
the coefficient gi is determined based on the ratio of amplitude of a (n−1)-order component to amplitude of a first-order component obtained by the DFT operation, and the method further comprising:
determining a rotation correction angle of NvsQ Lissajous in which the relationship between the N and the Q is represented on a phase planar, based on relative phases of the first-order component and the (n−1)-order component.

7. The head position demodulation method according to claim 2, wherein the phase difference Δθo is an integral multiple of 90°.

8. The head position demodulation method according to claim 2, wherein the phase difference Δθo is 45°.

9. The head position demodulation method according to claim 8, wherein
the value of amplitude obtained by offsetting the magnetic head to a plurality of positions in the cross-track direction or the ratio of change of the amplitude value to each offsetting is subjected to a DFT operation with respect to the servo pattern period,
the coefficient gi of a polynomial "Σ(gi×ri), i=1, 2, . . . " (where, when |N|>|Q|, r=|Q|/|N| or when |N|≤|Q|, r=|N|/|Q|) with two or more coefficients gi meeting "Σgi=1, i=1, 2, . . . " is determined based on the ratio of amplitude of a third-order component to the amplitude of the first-order component if the amplitude of the third-order component to amplitude of a seventh-order component is larger than a predetermined value, and the rotation correction angle of NvsQ Lissajous in which the relationship between the N and the Q is represented on a phase planar is determined based on the relative phases of the first-order component and the third-order component, and
the coefficient gi of a polynomial "Σ(gi×ri), i=1, 2, . . . " (where, when |N|>|Q|, r=|Q|/|N|/tan(π/n) or when |N|≤|Q|, r=|N|/|Q|/tan(π/n)) with two or more coefficients gi meeting "Σgi=1, i=1, 2, . . . " is determined based on the ratio of the amplitude of the seventh-order component to the amplitude of the first-order component if the amplitude of the third-order component to the amplitude of the seventh-order component is equal to or less than a predetermined value and if the division number n of one period of magnetization pattern in the cross-track direction is 8, and the rotation correction angle is determined based on the relative phases of the first-order component and the seventh-order component.

10. A magnetic disk device, comprising:
a magnetic head;
a magnetic disk in which an A-phase burst pattern and a B-phase burst pattern different from each other in phase in a cross-track direction are recorded; and
a control unit that, at demodulation of the A-phase burst pattern and the B-phase burst pattern, calculates the demodulated position of the magnetic head based on a sin component and a cos component in the A-phase burst pattern and a sin component and a cos component in the B-phase burst pattern, wherein, assuming that phase differences in the A-phase burst pattern and the B-phase burst pattern in the down-track direction are designated as Δφa and Δφb, respectively, when absolute values of Δφa and Δφb are equal, a cos component of a readback signal in the A-phase burst pattern is designated as cA and a sin component of the same as sA, a cos component of a readback signal in the B-phase burst pattern is designated as cB and a sin component of the same as sB, and sgn=+1 if Δφa/Δφb≥0 and −1 if Δφa/Δφb<0, the control unit calculates the demodulated position of the magnetic head using coefficients ca, sa, cb, and sb based on N and Q calculated as:

$$N=cA \cdot ca - sA \cdot sa + cB \cdot cb - sB \cdot sb \cdot sgn$$

$$Q=cA \cdot sa + sA \cdot ca + cB \cdot sb + sB \cdot cb \cdot sgn.$$

11. The magnetic disk device according to claim 10, wherein, assuming that the phase difference in the B-phase burst pattern in the cross-track direction is designated as Δθo with respect to the A-phase burst pattern, the coefficients ca, sa, cb, and sb at an arbitrary angle θabt are given as:

$$ca=\cos(\theta abt+\Delta\theta o/2), sa=\sin(\theta abt+\Delta\theta o/2)$$

$$cb=\cos(\theta abt-\Delta\theta o/2), sb=\sin(\theta abt-\Delta\theta o/2).$$

12. The magnetic disk device according to claim 10, wherein the absolute values of the phase differences Δφa and Δφb meet the relationship 0<|Δφa|=|Δφb|≤90°.

13. The magnetic disk device according to claim 10, wherein, assuming that when |N|>|Q|, r=|Q|/|N| or when |N|≤|Q|, r=|N|/|Q|, the control unit calculates a position error signal of the magnetic head based on a polynomial "Σ(gi×ri), i=1, 2, . . . " with two or more coefficients gi meeting "Σgi=1, i=1, 2, . . . ".

14. The magnetic disk device according to claim 10, wherein, assuming that division number n of one period of magnetization pattern in the cross-track direction has six or more servo patterns and when |N|>|Q|, r=|Q|/|N|/tan(π/n) or when |N|≤|Q|, r=|N|/|Q|/tan(π/n), the control unit calculates a position error signal of the magnetic head based on a polynomial "Σ(gi×ri), i=1, 2, . . . " with two or more coefficients gi meeting "Σgi=1, i=1, 2, . . . ".

15. The magnetic disk device according to claim 14, wherein the control unit
subjects to a DFT operation the value of amplitude obtained by offsetting the magnetic head to a plurality of positions in the cross-track direction or the ratio of change of the amplitude value to each offsetting with respect to the servo pattern period,
determines the coefficient gi based on the ratio of amplitude of a (n−1)-order component to amplitude of a first-order component obtained by the DFT operation, and determines a rotation correction angle of NvsQ Lissajous in which the relationship between the N and the Q is represented on a phase planar based on relative phases of the first-order component and the (n−1)-order component.

16. The magnetic disk device according to claim 11, wherein the phase difference $\Delta\theta o$ is an integral multiple of 90°.

17. The magnetic disk device according to claim 11, wherein the phase difference $\Delta\theta o$ is 45°.

18. The magnetic disk device according to claim 17, wherein the control unit subjects to a DFT operation the value of amplitude obtained by offsetting the magnetic head to a plurality of positions in the cross-track direction or the ratio of change of the amplitude value to each offsetting with respect to the servo pattern period, determines the coefficient gi of a polynomial "$\Sigma(gi \times ri)$, i=1, 2, ..." (where, when $|N|>|Q|$, $r=|Q|/|N|$ or when $|N| \leq |Q|$, $r=|N|/|Q|$) with two or more coefficients gi meeting "$\Sigma gi=1$, i=1, 2, ..." based on the ratio of amplitude of a third-order component to the amplitude of the first-order component if the amplitude of the third-order component to amplitude of a seventh-order component is larger than a predetermined value, and the rotation correction angle of NvsQ Lissajous in which the relationship between the N and the Q is represented on a phase planar based on the relative phases of the first-order component and the third-order component, and determines the coefficient gi of a polynomial "$\Sigma(g \times ri)$, i=1, 2, ..." (where, when $|N|>|Q|$, $r=|Q|/|N|/\tan(\pi/n)$ or when $|N| \leq |Q|$, $r=|N|/|Q|/\tan(\pi/n)$) with two or more coefficients gi meeting "$\Sigma gi=1$, i=1, 2, ..." based on the ratio of the amplitude of the seventh-order component to the amplitude of the first-order component if the amplitude of the third-order component to the amplitude of the seventh-order component is equal to or less than a predetermined value and if the division number n of one period of magnetization pattern in the cross-track direction is 8, and the rotation correction angle based on the relative phases of the first-order component and the seventh-order component.

* * * * *